O. J. KÜSTNER.
SPINNING MACHINE.
APPLICATION FILED APR. 23, 1910.
1,128,462.
Patented Feb. 16, 1915.
9 SHEETS—SHEET 6.
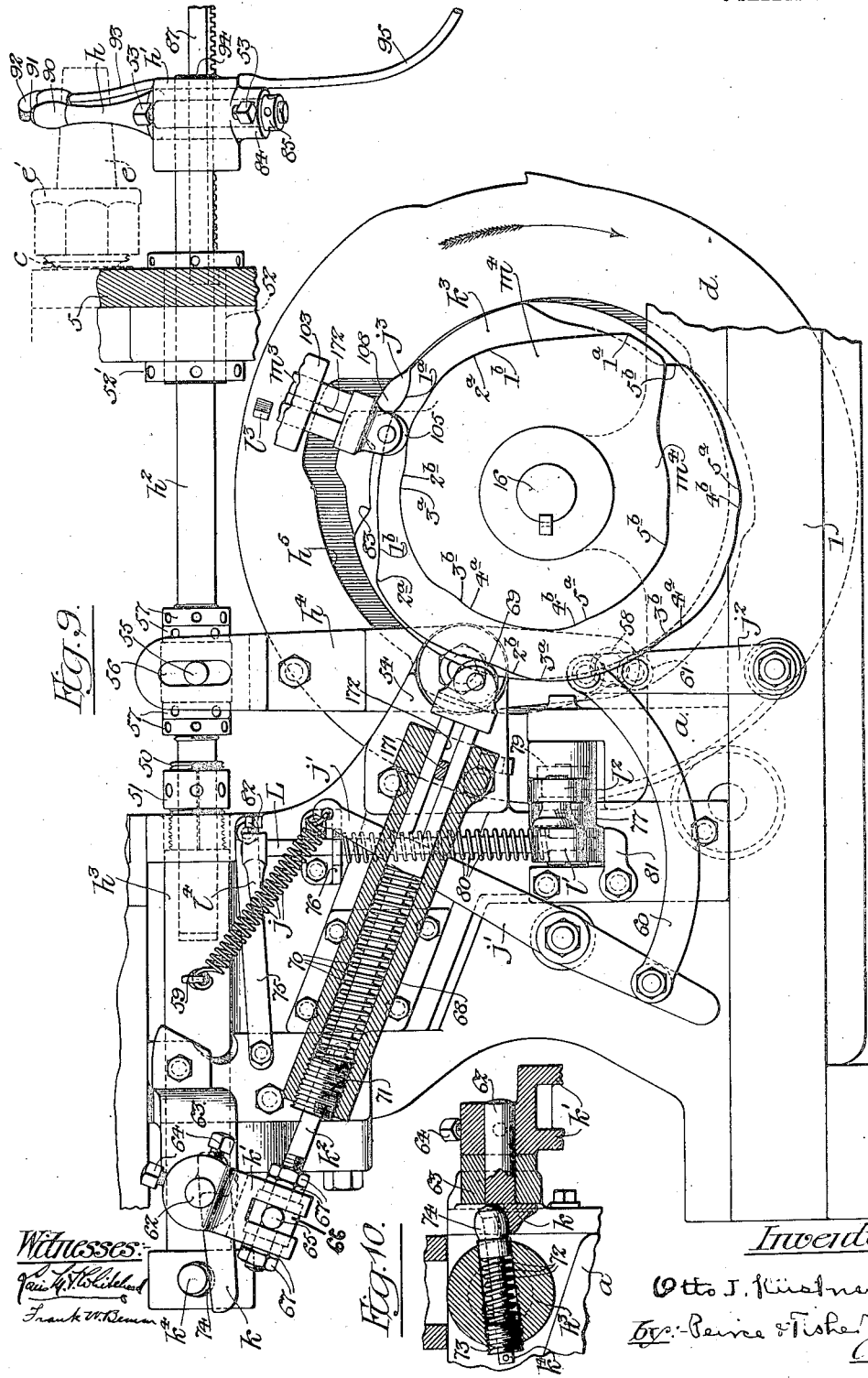

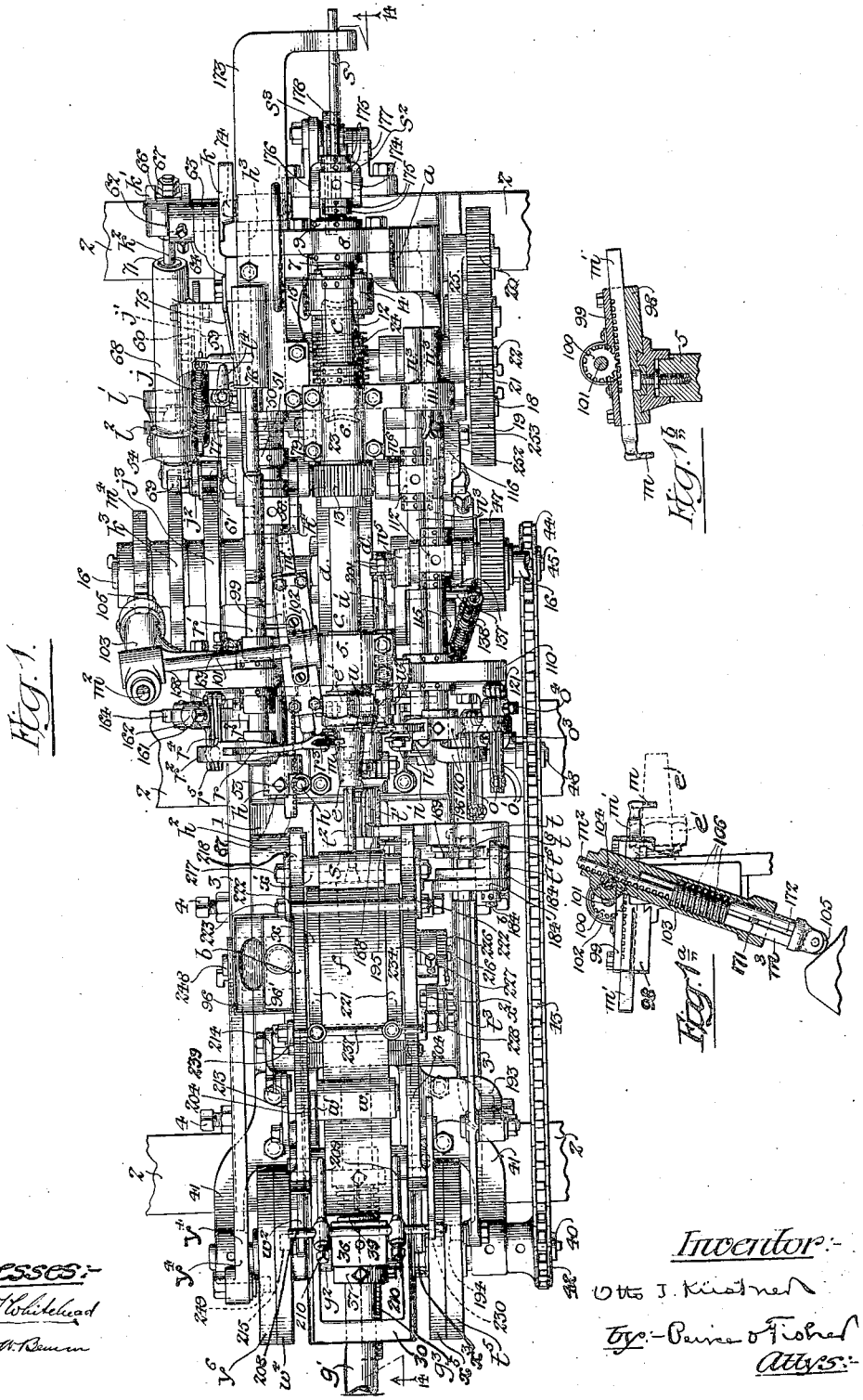

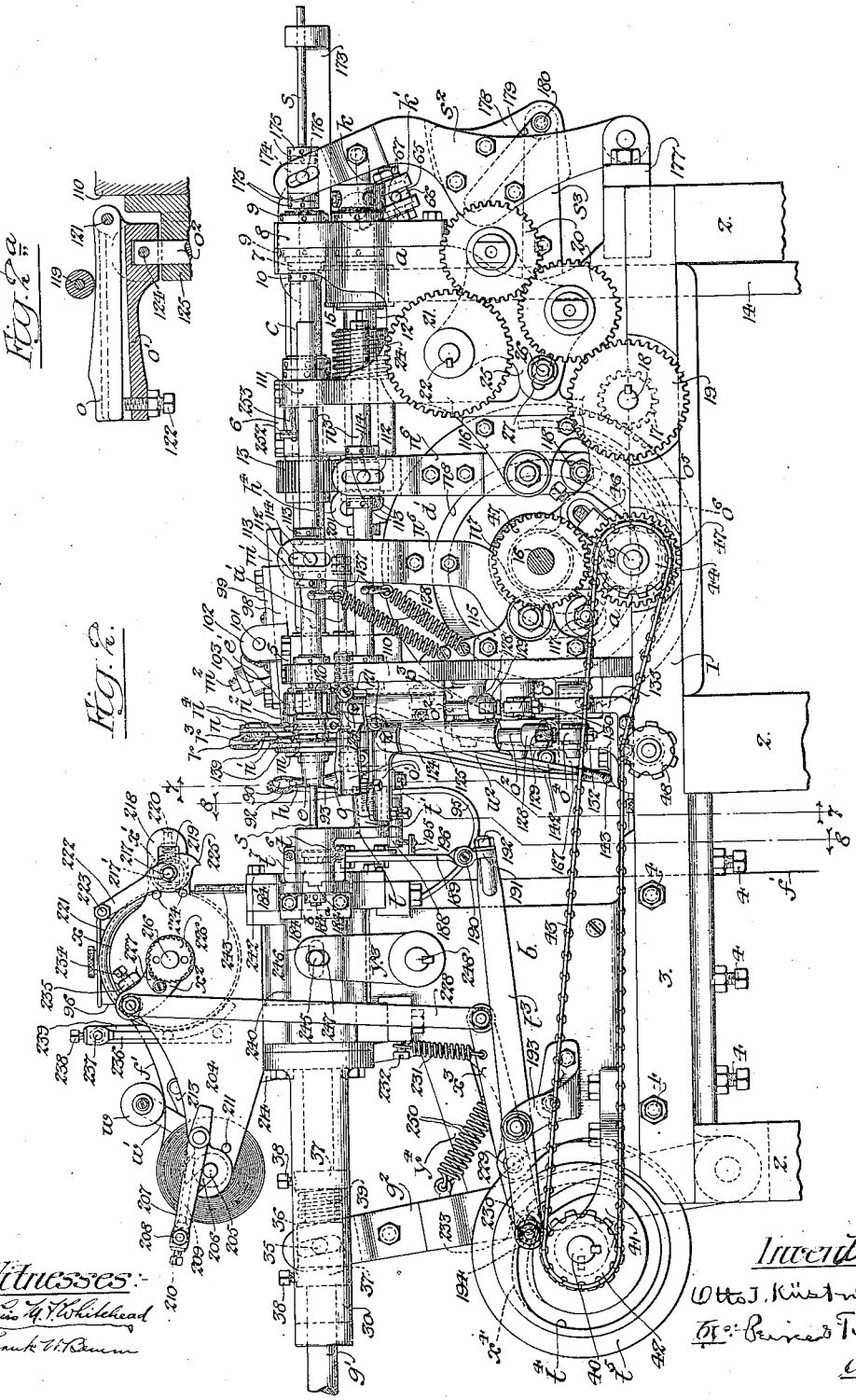

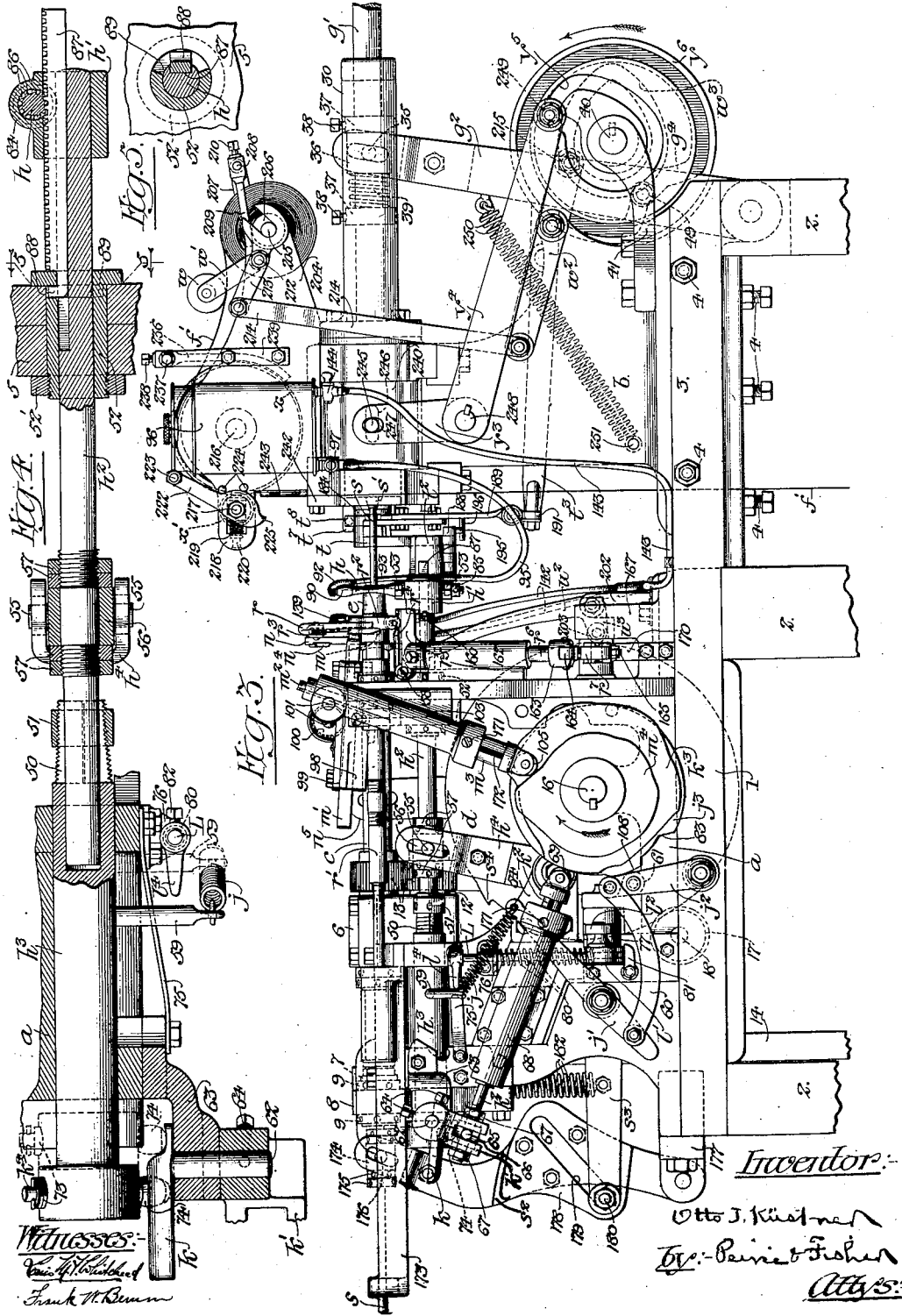

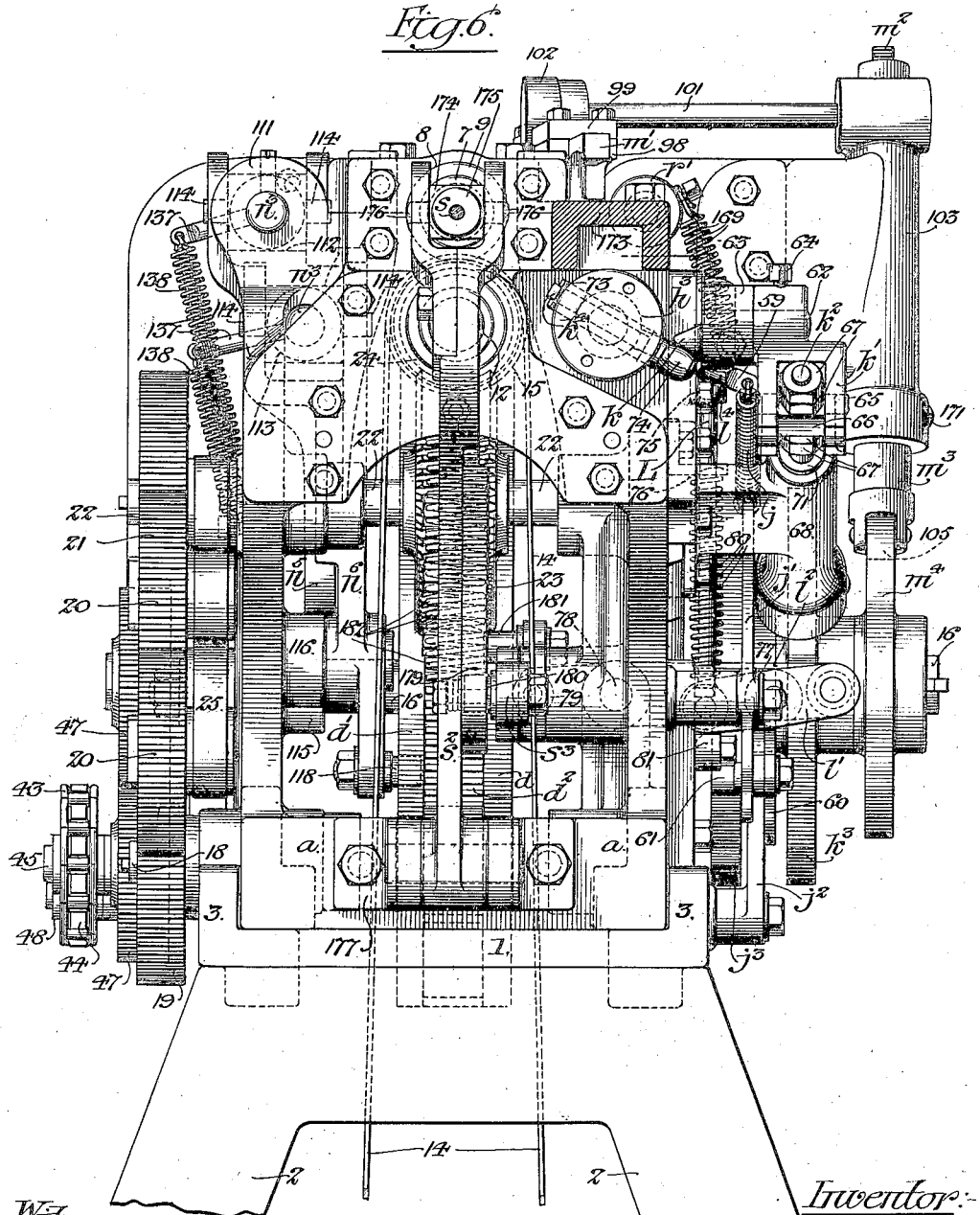

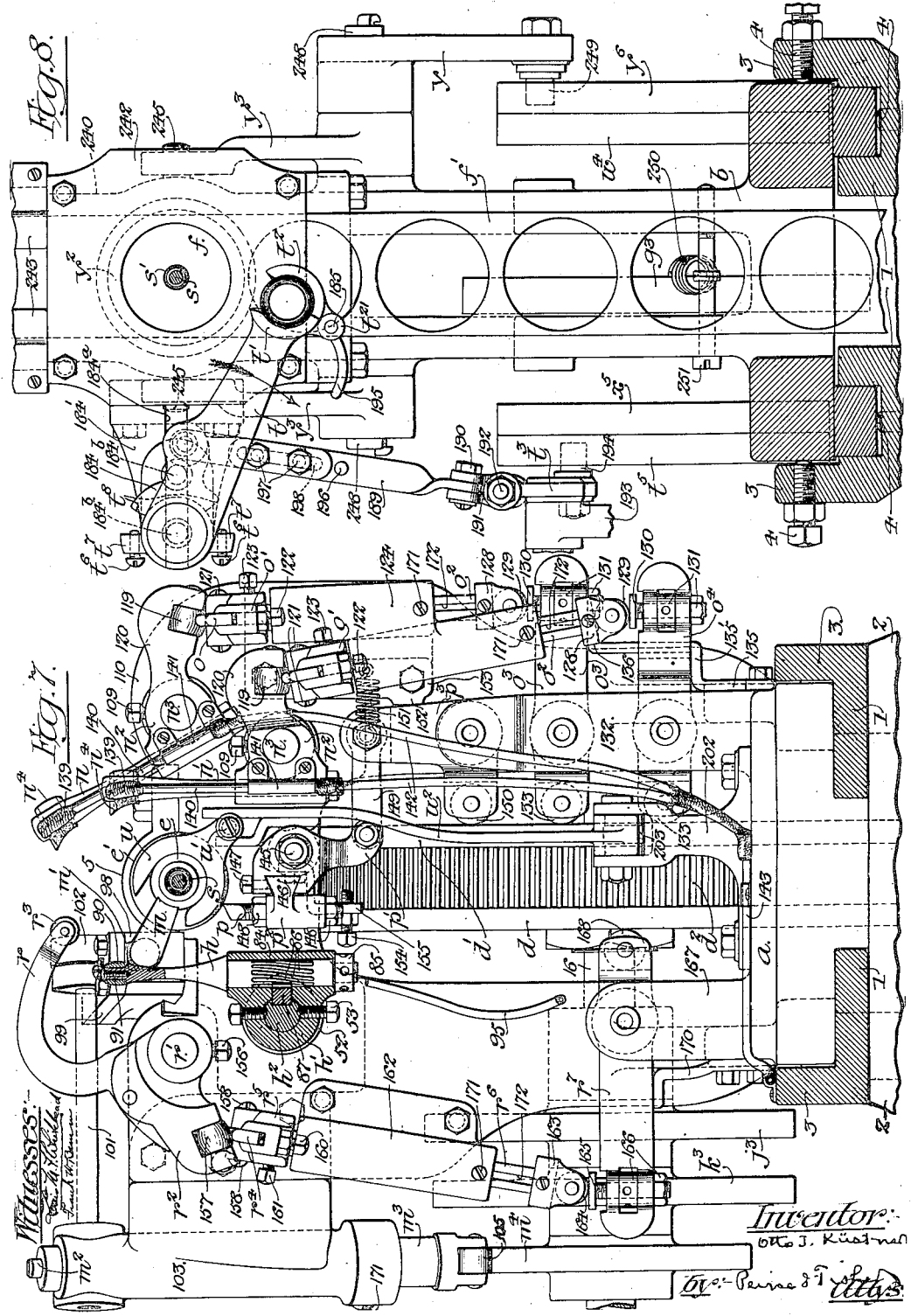

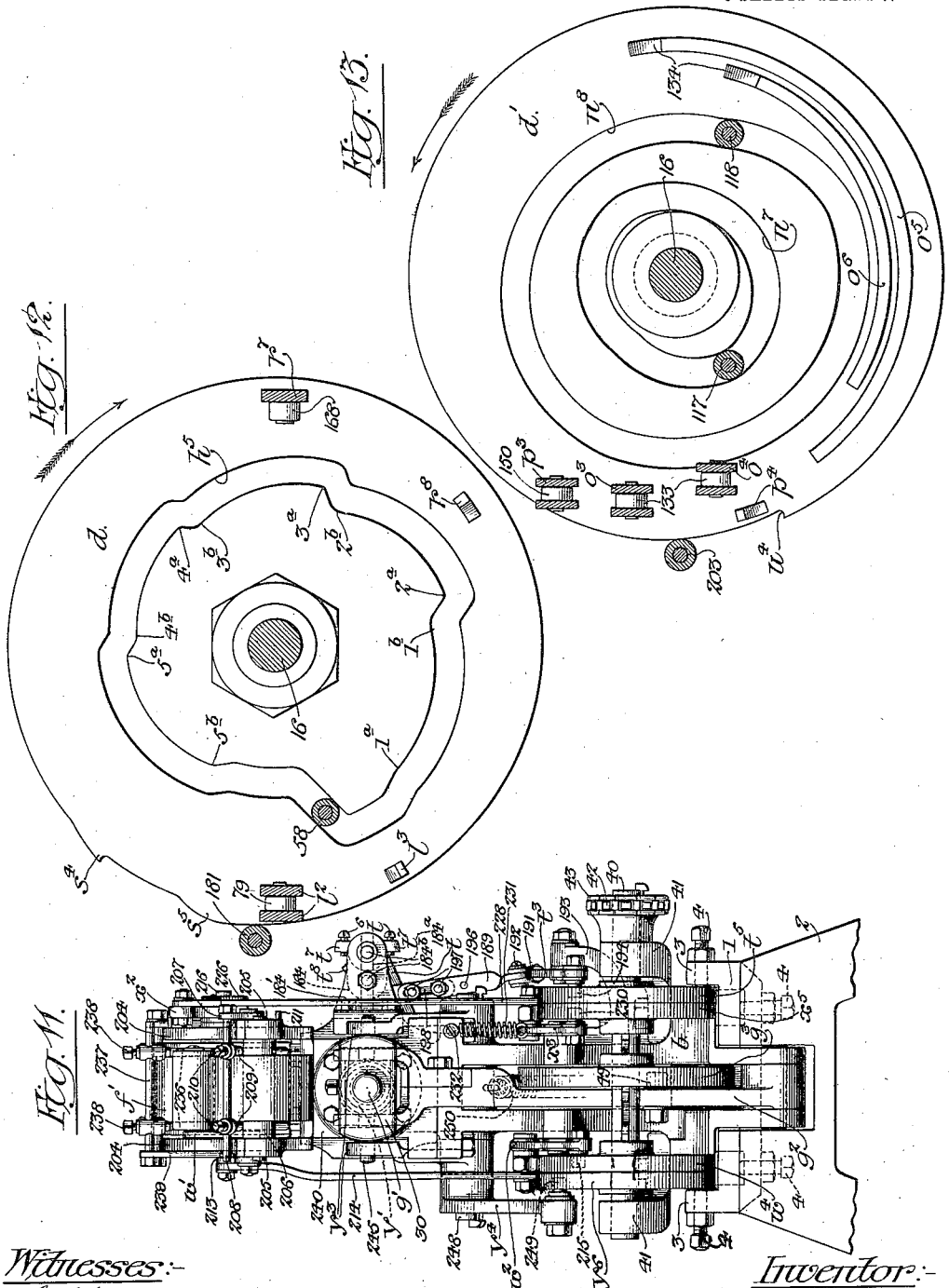

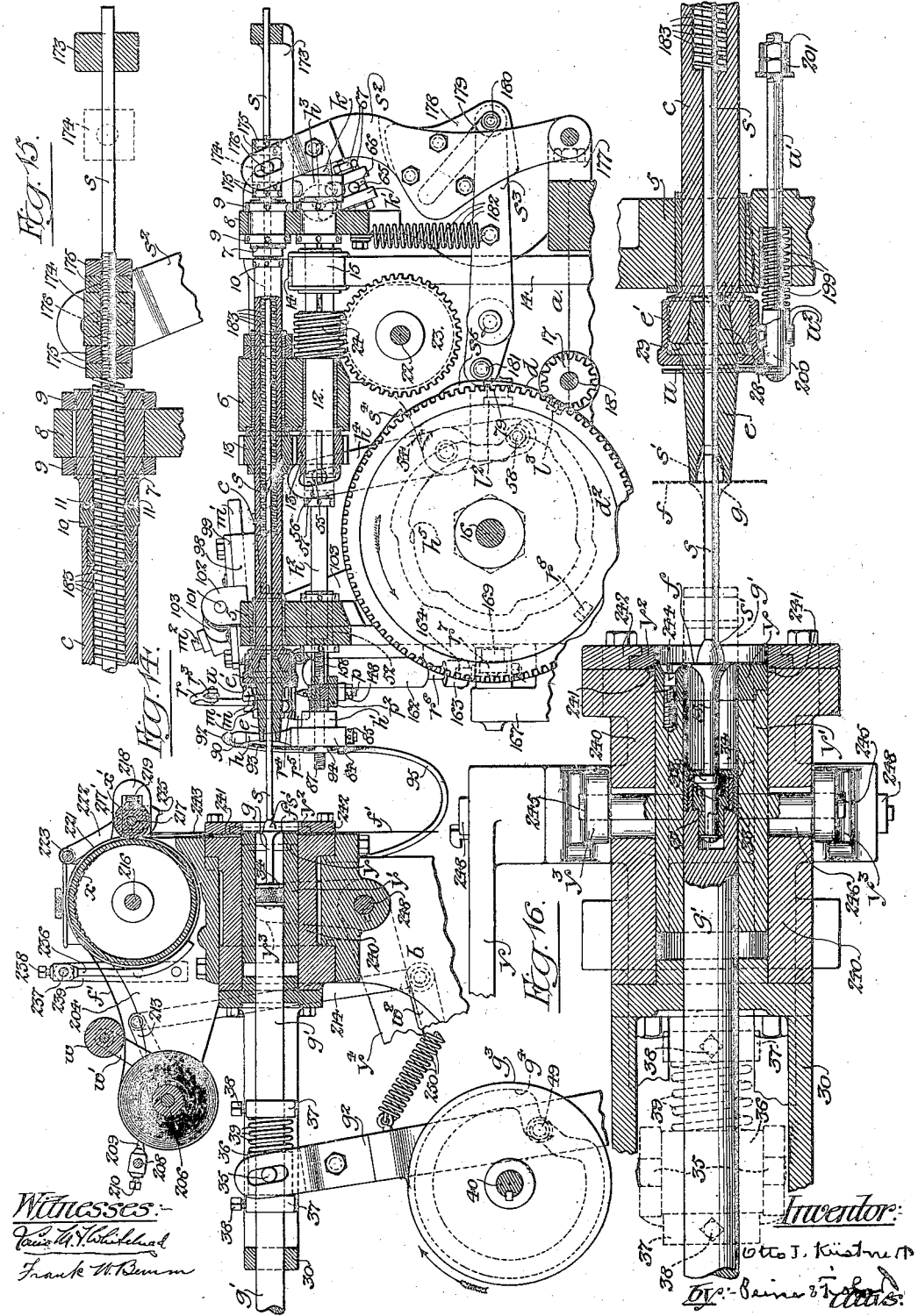

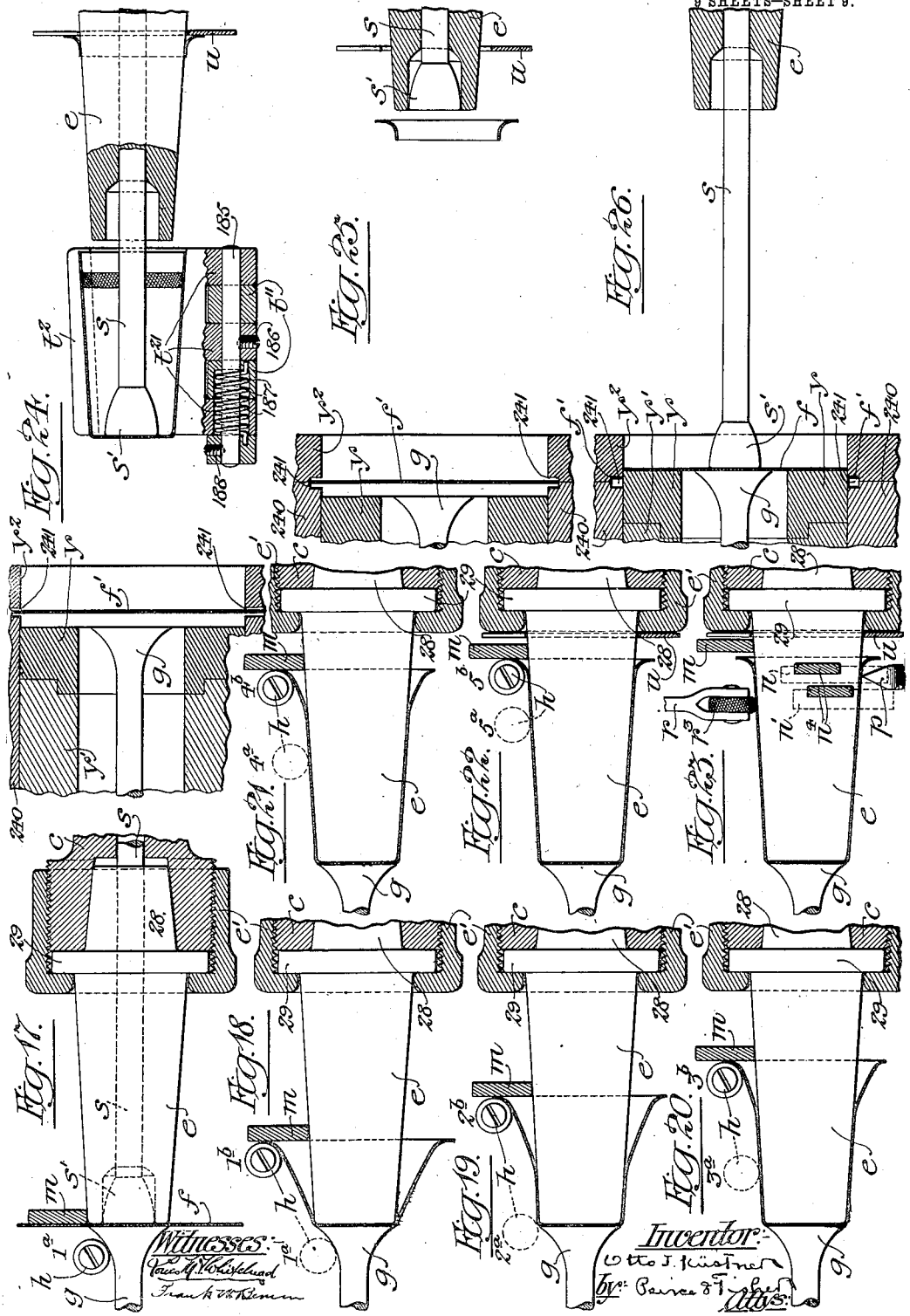

ns ns ns

# UNITED STATES PATENT OFFICE.

OTTO J. KÜSTNER, OF CHICAGO, ILLINOIS.

SPINNING-MACHINE.

1,128,462.  Specification of Letters Patent.  Patented Feb. 16, 1915.

Application filed April 23, 1910. Serial No. 557,139.

*To all whom it may concern:*

Be it known that I, OTTO J. KÜSTNER, a citizen of the United States, and a resident of Chicago, county of Cook, and State of Illinois, have invented certain new and useful Improvements in Spinning-Machines, of which the following is a specification.

The invention relates to a machine for automatically spinning articles from sheet metal, but is designed more particularly for spinning bottle caps from metal foil.

The invention seeks to provide a machine which is automatic in its operation and by which the metal blanks are cut from a continuous strip, quickly and accurately spun into shape and discharged from the machine.

The invention consists in the features of improvement hereinafter set forth, illustrated in the preferred form in the accompanying drawings and more particularly pointed out in the appended claims.

In the drawings, which illustrate the preferred embodiment of the invention, Figure 1 is a plan view of the machine. Figs. 1ª and 1ᵇ are detail sections illustrating the blank support and its operating mechanism. Fig. 2 is a side elevation of the machine. Fig. 2ª is a detail section illustrating a part of the mechanism which operates the finishing tool. Fig. 3 is an elevation of the opposite side of the machine. Fig. 4 is a plan view with parts in section, of the tool spindle. Fig. 5 is a detail section on the line 5—5 of Fig. 4. Fig. 6 is a view in elevation upon an enlarged scale of the end of the machine shown at the right in Figs. 1 and 2 with a part of the frame in section. Fig. 7 is a transverse section on the line 7—7 of Fig. 2 looking toward the right. Fig. 8 is a transverse section on the line 8—8 of Fig. 2 looking toward the left. Fig. 9 is a view in elevation with parts shown in section, of the tool spindle and its operating mechanism. Fig. 10 is a detail view with parts in section, of the guiding means for the tool spindle shown in side elevation in Fig. 9. Fig. 11 is a view in elevation of the end of the machine shown at the left in Figs. 1 and 2. Figs. 12 and 13 are elevations of opposite sides of the cam wheel with parts operated thereby shown in section. Fig. 14 is a partial view in vertical longitudinal section on the line 14—14 of Fig. 1, through the spinning mandrel. Fig. 15 is a detail view in vertical section of the rear ends of the spinning mandrel. Fig. 16 is a detail view in horizontal section of parts shown in Fig. 14. Figs. 17 to 26, inclusive, are detail views illustrating the operation of the machine.

The frame of the machine comprises a bed plate 1 mounted upon suitable supporting standards 2 and separate upright sections $a$ and $b$ mounted on the bed plate. Each of these upright frame sections comprise side portions connected at their upper and lower ends (see Figs. 1, 6, 7, 8 and 11) and are mounted on the bed plate between upwardly extending side flanges 3 thereof. The frame section $b$ can be adjusted to and from the frame section $a$ and is held in adjusted position by set screws 4 (see Figs. 2, 3 and 8).

A spinning mandrel $c$ (see Figs. 1 and 14) is journaled in suitable bearings formed centrally in two cross pieces 5 and 6 at the upper end of the frame section $a$. The end thrust upon the mandrel $c$ is taken up, in the form shown, by a sleeve 7 arranged within an opening in a cross piece 8 at the upper rear portion of the frame section $a$ and held in position therein by nuts 9. A bearing piece 10 is fixed to the end of the mandrel and the adjacent end faces of this piece and of the sleeve 7 are provided with annular grooves which receive a row of balls 11. The spinning mandrel $c$ may be driven in any suitable manner. In the form shown, a drive shaft 12 is journaled in the cross pieces 6 and 8 below the outer end of the mandrel and is connected thereto by a pair of intermeshing spur pinions 13. A drive belt 14 extends from a suitable power shaft (not shown) below the bed plate 1 over a pulley 15 on the shaft 12 and rotates this shaft and the spinning mandrel $c$ at high speed.

A cam wheel, for operating different parts of the machine, is mounted in line beneath the mandrel $c$ upon a shaft 16 which is journaled in the sides of the frame section $a$. For convenience in manufacture, the cam wheel is formed of three separate sections $d$, $d^1$ and $d^2$. The operating cams are formed upon the outer sections $d$ and $d^1$ of the cam wheel, while the mid-section $d^2$ is provided with gear teeth (see Figs. 7, 12, 13 and 14). The teeth of the mid-section or gear $d^2$ mesh with the teeth of the drive pinion 17 upon a cross shaft 18. At one end (see Fig. 2) the shaft 18 is provided with a gear 19 which is connected by two intermediate idler gears 20 to a gear 21 on a cross shaft 22. The shaft 22, as shown in Fig. 14, is provided with a worm wheel 23, the teeth of which are engaged by a worm 24 on the drive shaft 12. By the train of gears described, the operating cam wheel is driven from the shaft 12 at a considerably reduced speed and the speed of the spinning tools and other parts operated by the cam wheel will bear a proper relation to the desired speed of the spinning mandrel $c$, which is also driven from the shaft 12. By changing the intermediate idler gears 20, the relative speeds of the cam wheel and spinning mandrel may be changed, as may be desired or necessary. To facilitate this change, the idlers are journaled upon a plate or bracket 25 which is hung or pivoted upon the shaft 22 and is held in position by a bolt 26, extending through a portion of the frame section $a$ and through a slot 27 in one corner of the plate or bracket 25.

A suitable form $e$, upon which the article is spun (see Fig. 16), is removably mounted upon the end of the mandrel $c$. This form is shaped in accordance with the article to be manufactured and, as the machine is particularly designed for forming bottle caps, the form shown is tapered or cone-shaped. At one end it is provided with a reduced, conical portion 28, which fits within a correspondingly shaped seat in the enlarged end of the spinning mandrel $c$, and a flanged sleeve $e^1$ threaded on the enlarged end of the mandrel engages a flange 29 on the form and removably secures the same in position. By this arrangement, other forms having a different taper or size may be substituted, as desired.

The blank $f$, which is to be spun, is held against the end of the form $e$ by a shiftable clamp or blank-holder $g$, as shown in dotted lines in Fig. 16 and in full lines in Fig. 17. This blank-holder (see Fig. 16) is rotatably mounted upon the end of a spindle $g^1$ (see Fig. 16), which is arranged in line with the spinning mandrel $c$ and slides longitudinally through suitable bearings in a projecting bracket 30 (see Figs. 1 and 14) upon the upper end of the frame section $b$. A bearing piece 31 (see Fig. 16) is arranged in a socket in the inner end of the clamp supporting spindle $g^1$ and the clamp or blank-holder $g$ is journaled in the bearing piece. The clamp or blank-holder is also provided with a conical shoulder 32 which engages a row of anti-friction balls 33 arranged in a groove in the outer end of the bearing piece 31. A flanged sleeve or thimble 34, threaded on the end of the spindle $g^1$, extends over the shoulder 32 and holds the clamp or blank-holder against displacement. A shifter arm $g^2$ (see Figs. 2, 11 and 14) is pivotally mounted at its lower end upon the lower outer portion of the frame section $b$ and its upper forked end is provided with slots which are engaged by pins 35 laterally projecting from a sleeve 36 on the spindle $g^1$. The sleeve 36 is loosely mounted on the spindle between two collars 37 adjustably fixed thereto by set screws 38. A spring 39 coiled about the spindle, extends between the innermost collar 37 and the sleeve 36, so that the shifter arm $g^2$ moves the spindle $g^1$ and blank-holder $g$ inwardly or toward the form $e$ through the medium of the spring 39. The blank-holder $g$, when in the position shown in dotted lines in Fig. 16, is pressed by this spring to firmly hold the blank $f$ against the end of the form $e$. At the same time, the blank-holder $g$ is free to rotate with the spinning mandrel $c$ and form $e$, the end thrust being taken up by the row of anti-friction balls 33.

The shifter arm $g^2$ for the spindle and blank-holder is controlled by a cam $g^3$ which is centrally fixed to a horizontal shaft 40 (see Figs. 11 and 14). This shaft (see Figs. 1 and 2) is journaled in brackets 41 which project rearwardly from the lower, outer portion of the frame section $b$. At one end the shaft is provided with a sprocket wheel 42 and a chain 43 passes over this wheel and over a sprocket wheel 44 on a short shaft 45. This shaft is journaled in an adjustable bracket 46 below the cam wheel shaft 16 and is connected thereto by a pair of intermeshing gears 47. The chain 43 also passes over an idler sprocket 48 rotatably mounted upon the side of the bed plate 1.

The cam $g^3$, as shown in Fig. 11, is centrally fixed to the shaft 40 and is provided on one side with a cam slot $g^4$ (see Fig. 14) which engages a pin or roller 49 on the side of the shifter arm $g^2$. The greater portion of the cam slot $g^4$ is circular and when the pin or roller 49 is in this portion of the slot the blank-holder $g$ holds the blank $f$ against the form $e$ as the blank is operated upon by the spinning mechanism.

A spinning tool $h$ (see Figs. 3, 4, 7 and 9) is mounted in a holder $h^1$ which is adjustably secured to the end of an operating spindle. This spindle (see Fig. 4) is preferably formed of separate sections $h^2$ and $h^3$. The spindle section $h^2$ extends within a socket in the section $h^3$ and is adjustably secured thereto by a split conical clamp 50. This clamp is formed upon the inner end of the spindle section $h^3$ and is provided with external screw threads and is pressed into engagement with the spindle section $h^2$ by a nut 51. The spindle section $h^3$ is mounted in bearings at the upper outer portion of the frame section $a$ and the spindle section $h^2$ fits within a bearing sleeve 52 in the upper inner portion of the frame section $a$. The tool operating spindle, as a whole, is both longitudinally movable to shift the spinning tool $h$ over the form $e$ and is also free to partly rotate or oscillate, to move the tool laterally to and from the form e. The toolholder $h^1$ is rotatably adjustable upon the end of the spindle section $h^2$ and is fixed in adjusted position thereon by set screws 53 (see Fig. 7) so that the position of the spinning tool relatively to the form $e$, may be nicely adjusted or changed when forms of different sizes are employed.

The tool spindle is arranged slightly below and at one side of the spinning mandrel $c$ and is reciprocated to move the tool longitudinally over the form by a shifter arm $h^4$. This shifter arm is pivoted intermediate its ends on a bracket 54 of the frame section $a$ and its upper forked end is provided with vertical slots, which are engaged by pins 55 projecting laterally from a collar 56 on the spindle section $h^2$. This collar is connected to the spindle to shift longitudinally therewith by adjustable and locking nuts 57, but the spindle is free to rotate or oscillate within the sleeve. At its lower end the shifter arm $h^4$ is provided with an inwardly projecting pin 58 having an anti-friction roller thereon and engaging a cam slot $h^5$ formed in the face of the outer section $d$ of the cam wheel (see Figs. 9 and 12). The cam wheel on the shaft 16 makes a single revolution for each operation of the machine. The slot $h^5$, as most plainly shown in Fig. 12, is so shaped that the spindle $h^2$ and spinning tool $h$ will be successively reciprocated a number of times for each revolution of the cam wheel. In the particular form shown, the cam slot is so designed that the tool will be reciprocated five times for each revolution of the cam wheel or for each operation of the machine. Moreover, the cam slot is such that these reciprocations are of different length.

The spindle section $h^3$ is provided with a laterally projecting pin 59 which is connected to one end of a spring $j$. The opposite end of this spring is connected to the upper end of a lever arm $j^1$ pivoted between its ends to one side of the frame section $a$. The lower end of the lever arm $j^1$ is connected by a link 60 to the upper end of an arm $j^2$ pivoted on the edge of the bed plate 1. The arm $j^2$ is provided with a pin or roller 61 which engages the edge of a cam $j^3$ on the shaft 16. The function of this cam is to shift the arms $j^1$ and $j^2$ and thereby vary the tension of the spring $j$ at different periods of the operation of the spinning tool.

The spring $j$ tends to oscillate the tool spindle $h^2$—$h^3$ and throw the tool $h$ away from the form $e$. The tool is, however, held to its work during the spinning operation against the tension of the spring $j$ and its lateral position relative to the form $e$ is controlled by a guide block $k$ (see Figs. 3, 4, 9 and 10). This guide block is provided at one end with a spindle 62, which is journaled in an arm or lug 63 on the frame. A short crank arm $k^1$ is adjustably fixed to the outer end of the spindle by set screws 64. The lower, forked end of the arm $k^1$ is slotted and engages pins 65 which project laterally from a collar 66 on one end of a shifting plunger $k^2$. The collar is held in position upon the end of the plunger by adjusting and locking nuts 67. The plunger extends through a diagonally arranged guide casing 68 upon the side of the main frame, and at its lower end is provided with a roller 69 which engages the edge of a cam $k^3$ on the shaft 16. The lower end of the plunger is enlarged and a spring 70 is coiled about the plunger within the guide casing 68, the ends of the spring engaging the enlarged lower end of the plunger, and an adjusting thimble 71 threaded into the upper end of the guide casing.

The outer end of the spindle section $h^3$ is enlarged and is provided with a transverse opening in which is arranged a pin $k^4$. A spring 72, coiled about the pin, extends between a shoulder thereon and a guide plug 73 threaded into the opening and this spring tends to push the pin outwardly. The outer end of the pin is provided with an anti-friction roller 74 which, during the spinning operation of the tool $h$, rests upon the upper face of the guide block $k$, as shown in Figs. 9 and 10. The irregular shaped cam $k^3$ oscillates the guide block $k$ as the cam-shaft 16 and cam section $d$ rotate, so that, as the tool spindle and tool $h$ are reciprocated by the cam slot $h^5$, the spindle will be oscillated to move the tool laterally to and from the form $e$. The cam groove $h^5$, which effects the successive reciprocations of the tool and its spindle and the guide cam $k^3$, which controls the lateral movement of the tool, are so shaped that the tool will move over the face of the blank in a series of different paths, and the blank is drawn and shaped upon the form $e$ step-by-step to complete the article, as illustrated in Figs. 17 to 22.

The cam groove $h^5$ is so shaped that the last, completed reciprocation of the tool is of such length that the pin $k^4$ on the outer end of the spindle section $h^2$ is carried over the outer end of the guide block $k$. The spring $j$ then acts to oscillate the spindle and lift the tool $h$ away from the form $e$, as shown in Fig. 7. The cam groove $h^5$ then shifts the tool operating spindle and returns the tool to a position opposite the end of the form $e$, as shown in Figs. 3 and 4, the roller 74 on the end of pin $k^4$ passing beneath the guide block $k$, and the tool remains in this up-lifted position until the next succeeding operation. When the pin $k^4$ is thus disengaged from the guide block $k$, the spindle is oscillated by the spring $j$, until the pin 59 on the spindle engages a short, horizontal guide bar 75 (see Figs. 3 and 4) fixed to the frame below the pin.

Adjacent the inner end of the guide bar 75 is arranged an upright shifter rod L which slides vertically through a projecting guide lug 76 on the side of the frame section $a$. At its lower end the shifter rod is pivoted to an arm $l^1$ (see Figs. 6 and 9). This arm is pivoted between its ends to a lug 77 that projects outwardly from a bracket on the side of the frame section $a$. At its outer end the arm $l^1$ is pivoted to the outer end of an arm $l^2$. This arm is pivoted adjacent its inner end at 78 to the side of the frame section $a$ (see Fig. 6) and at its inner, forked end carries a roller 79 (see Figs. 6 and 12) which is arranged adjacent the face of the cam $d$ of the operating cam wheel, and which is engaged by a cam lug $l^3$ thereon to shift the arms $l^1$ and $l^2$ and thereby lift the shifter rod L. The latter is held in normal position by a spring 80 coiled about the rod and extending between the guide lug 76 and the inner end of the arm $l^1$. In normal position, as shown, the arm $l^1$ rests upon a stop lug 81. At its upper end the shifter rod carries a laterally projecting arm $l^4$ which is adjustably fixed to the rod by a set screw 82.

At the end of each operation the cross pin $k^4$ at the outer end of the tool operating spindle is disengaged from the upper face of the guide block $k$, as described, and is in the position shown in full lines in Fig. 4. At the beginning of the next operation, the tool spindle is first shifted inwardly by the operation of the cam groove $h^5$ of the cam $d$ upon the arm $h^4$, and the pins $k^4$ and 59 on the spindle are shifted to the dotted positions shown in Fig. 4. The outer end of the pin $k^4$ is then beyond the inner end of the guide block $k$ and the pin 59 is above the transverse arm $l^4$ of the shifter rod L. The lug $l^3$ of the cam $d$ then engages the roller and the inner end of the arm $l^2$, and the shifter rod L is shifted against the tension of the spring 80. This movement of the shifter rod, through the engagement of the arm $l^4$ thereon with the pin 59 on the spindle, oscillates the spindle against the tension of the spring $j$ and moves the roller 74 on the inner end of the pin $k^4$ above the guide block and holds it in this position until the return longitudinal movement of the spindle brings the guide roller into engagement with the upper face of the guide block. The guide block then holds the tool to its work and controls its lateral movement as the tool and spindle are reciprocated, until the end of the operation, when the pin $k^4$ is again disengaged from the guide block, as previously described.

The cam $j^3$, which acts on the roller 61 of the arm $j^2$ to thereby control the tension of the spring $j$, is nearly circular in outline, but at one point is provided with a depression 83 (see Figs. 3 and 9) which engages the roller 61, and thereby reduces the tension of the spring $j$, at the time that the cam lug $l^3$ engages the arm $l^2$ to operate the shifter rod L. The spindle is thus readily oscillated by the rod to bring the pin $k^4$ into engagement with the upper face of the guide block. The roller 74 at the inner end of the pin $k^4$ is spherical or nearly so in form, so that it will properly engage the curved upper surface of the guide block $k$, as the latter and spindle are oscillated during the spinning operation. If the operation of the machine is arrested, the operator may press the pin inwardly against the tension of its spring 74 out of engagement with the guide block, and the spring $j$ will then oscillate the spindle and throw the tool $k$ away from the form $e$. The spring $j$ not only takes up the lost motion between the pin $k^4$ and guide block $k$ which control the oscillation of the spindle and the lateral movement of the tool, but also extends forwardly from the pin 59 to the upper end of the arm $j^1$ so that it takes up the lost motion between the spindle, shifter arm $h^4$ and cam slot $h^v$, which control the longitudinal movements of the spindle and tool. The different movements of the tool, during the spinning operation, are thus accurately effected, as is necessary for proper work.

As the spinning tool $h$ is moved bodily in a series of different paths during the spinning operation, it is also preferably rotated upon its own axis. For this purpose, its lower end is journaled in a bearing 84 in the tool support $h^1$ and which bearing, as is most plainly shown in Fig. 7, is arranged on one side of and at right angles to the tool operating spindle $h^2$. A shoulder on the tool engages one end of the bearing and a nut 85 engages the opposite end of the bearing. Within the bearing the tool is provided with a series of gear teeth 86 which are preferably spirally disposed to reduce lost motion and wear. A rack bar 87 (see Figs. 4 and 9) is arranged in a groove formed in the side of the spindle and is provided with properly shaped teeth to mesh with the teeth 86 on the shank or stem of the tool. The end of the rack bar extends within the bearing sleeve 52 and is provided with an out-turned lug 88 which engages a segmental slot 89 (see Figs. 4 and 5) formed in the bearing sleeve 52 adjacent its flanged end. This sleeve is set within the opening in the transverse portion 5 of the frame section $a$ and is held in position by a nut 52'. The rack bar 87 is thus held against longitudinal movement, but oscillates with the spindle $h^2$ and tool $h$ thereon. As the spindle is reciprocated longitudinally the rack bar operates to rotate the tool upon its axis. By thus rotating the tool it operates more efficiently and is less liable to tear or injure the metal foil operated upon.

The outer end of the tool, which operates upon the foil, is preferably provided with a spherical piece 90 of hardened steel which is rigidly secured thereto by a screw 91 (see Fig. 7). To further reduce friction and the development of heat between the tool and the sheet metal operated upon, a brush or wad 92 of absorbent material, such as cotton waste or the like, is arranged adjacent the operating end of the tool and is carried upon the upper end of a short piece of metal pipe 93. This pipe is fixed to the end face of the tool support $h^1$ by a clamp 94 (see Fig. 14) and is connected by a flexible rubber pipe 95 with a supply tank 96 (see Figs. 1 and 3). This tank is secured in elevated position above the tool upon the upper end and at one side of the frame section $b$. The end of the rubber pipe 95 engages a nipple of a regulating valve 97, which is fixed to the lower end of the tank and controls the feed of water or preferably of soap and water through the pipe to the brush or wad of absorbent material 92.

Above the center of the form $e$ and at one side thereof is arranged a shiftable support for the metal blank comprising a short transverse plate $m$ (see Figs. $1^a$, $1^b$, 3 and 7). This shiftable plate is arranged adjacent the operating end of the spinning tool $h$ and engages and supports one side of the metal blank as the tool operates upon the other side thereof. In the construction shown, this blank support is formed upon the end of a sliding bar $m^1$ and projects laterally therefrom. The bar $m^1$ is arranged to slide longitudinally in a guide block 98, being held in position therein by a cover plate 99. The guide block 98 is adjustably mounted upon the upper, inner portion of the frame section $a$, at a slight incline to the spinning mandrel, as most clearly shown in Fig. 1, so that the blank support $m$ will move in proper relation to the tapered or conical form $e$. The upper edge of the bar $m^1$ is provided with rack teeth which are engaged by the teeth of a pinion 100 upon the inner end of a shaft 101 (see Fig. $1^b$). This shaft is journaled at its inner end in a bearing 102 on the guide block and at its outer end in the upper end of a hollow guide casing 103, fixed to the upper side portion of the frame section $a$. At its outer end the shaft is provided with teeth 104 (see Fig. $1^a$) which mesh with the teeth of a shifting rack bar $m^2$. This rack bar is guided at its upper end in an opening at the upper end of the casing 103 and at its lower end is fixed to a plunger $m^3$, which is guided in and projects from the lower end of the casing. A roller 105 upon the lower end of the plunger $m^3$ engages the edge of an irregular shaped cam $m^4$ upon the outer end of the operating cam shaft 16. A stiff spring 106 (see Fig. $1^a$) is coiled about the plunger within the casing 103 and extends between a shoulder in the casing and the enlarged lower end of the plunger. This spring holds the plunger firmly in engagement with the operating cam $m^4$ and also securely holds the blank support $m$ in the position determined by the cam $m^4$.

In spinning by hand it is usual to employ a similar metal support which is held against the side of the blank opposite that upon which the spinning tool operates, and the metal of the blank is drawn out, as it is spun, between the tool and the metal support. In hand spinning, the metal support and spinning tool are held in the operator's hands and are so manipulated that a varying pressure is applied to the blank. Considerable skill is necessary in properly manipulating the tool and support to apply the proper amount of pressure and properly support the edge of the metal blank during the spinning operation. If too much pressure is applied to the blank of metal foil, such as used for bottle caps, it will be crushed. If not enough pressure is applied, the metal will not be properly drawn out. In the present machine, the peculiarly shaped cam $m^4$ is designed to variably shift the metal support during the successive reciprocations of the spinning tool $h$ in such a manner that the proper amount of pressure is applied to the blank during the forward or spinning strokes of the tool, and so that the pressure of the support upon the blank is relieved during the backward or idle movement of the tool. In Fig. 3, the parts of the machine are shown in the position assumed just before the spinning operation is commenced. The operating cam shaft 16 rotates in the direction indicated by the arrow, and as soon as the high point of the cam $m^4$ is brought beneath the roller 105 of the plunger $m^3$, the blank support $m$ is moved to a position flush with the end of the form $e$, as shown in Fig. 17. In this position, the metal support abuts against one face of the blank $f$ which is held in position upon the end of the form $e$ by the blank holder $g$ and the tool $h$ is in the position $1^a$ indicated in Fig. 17, ready to commence the spinning operation. During the first movement of the tool over the face of the blank from $1^a$ to $1^b$ to shape the blank, as shown in Fig. 18, the portion of the cam $m^4$ from $1^a$ to $1^b$ acts upon the roller 105 of the plunger $m^3$ and the metal support is moved away from the end of the form $e$, but is maintained in contact with the edge of the metal blank so that the pressure is applied to the blank by the support and spinning tool to draw out the metal body thereof. At the end of the first stroke of the tool, the speed of movement of the blank support $m$ is slightly reduced by the cam $m^4$, so that the pressure upon the blank is increased. As the tool returns to position $2^a$ (see Fig. 19) the edge portion from $1^b$ to $2^a$ of the cam $m^4$ moves beneath the end of the plunger $m^4$ and the metal support $m$ remains stationary. During the second stroke of the tool from $2^a$ to $2^b$ (see Fig. 19) the portion of the cam $m^4$ from $2^a$ to $2^b$ (see Fig. 9) moves beneath the end of the plunger $m^3$. During about a half of this second stroke of the tool, the metal support $m$ remains stationary to exert the proper amount of pressure on the blank to draw out the blank, but at the end of the stroke it is shifted still farther away from the end of the form to relieve the pressure.

The operation of the spinning tool $h$ and the metal support $m$ is similar during the third, fourth and fifth strokes from $3^a$ to $3^b$, from $4^a$ to $4^b$ and from $5^a$ to $5^b$, as indicated in Figs. 20, 21 and 22, and the corresponding portions of the cam $m^4$ are indicated in Fig. 9. After the tool completes its last stroke, it is moved away from the form $e$ and is finally returned to the position $1^a$ (see Fig. 17) and commences the next operation. Meanwhile, the portion of the cam $m^4$ from $5^b$ to $1^a$ (see Fig. 9) passes beneath the end of the plunger $m^3$ and the metal support is first moved away from the edge of the completed bottle cap, as shown in Fig. 23, and is then returned to its position flush with the end of the form $e$, as shown in Fig. 17. After the first stroke of the spinning tool, the metal supporting plate $m$, as shown in Figs. 18 to 22, inclusive, engages and sustains the edge of the metal blank. The arrangement of this blank support has been found effective for light metal foil which may be easily damaged during the spinning operation, if not properly supported.

The longitudinal and rotary or oscillating movements of the tool operating spindle are controlled, as previously described, by the cam slot $h^5$ of the cam $d$ and the cam $k^3$, which respectively operate the spindle shifter $h^4$ and the guide block $k$ in such a manner that, during the spinning operation, the tool $h$ is shifted both longitudinally and laterally, so that its operating end moves through the series of strokes indicated in Figs. 1 to 22, inclusive, the corresponding portions of the cams $h^5$ and $k^3$ being indicated on Figs. 9 and 12. Means are thus provided whereby the spinning tool is operated over the face of the blank from a point inside its periphery outwardly to the edge thereof, in a series of successive and different paths to gradually draw and shape the blank step-by-step to complete form. With the tool operating in this manner in connection with the coöperating metal support $m$, it is possible to spin bottle caps and similar articles of light metal foil.

In the machine illustrated, the spinning tool $h$ and the metal support $m$ are arranged on one side of the spinning mandrel $c$ and form $e$ and slightly above a horizontal plane extending through the axes of these parts. It is to be understood that the tool and metal support may be otherwise arranged relatively to the spinning mandrel and form, but it is necessary that they shall be opposed to each other to operate properly upon opposite sides of the blank. The rotation of the tool about its axis and the means for supplying water to the surface of the blank operated upon, also adds to the efficiency of the machine in spinning articles from light metal foil.

By changing the form $e$ and adjusting the tool $h$ upon the spindle $h^2$ and a guide block 98 for the blank support $m$, bottle caps of different sizes and taper may be spun.

The cams $j^3$, $k^3$ and $m^4$ are arranged one beside the other on the end of the cam operating shaft, as most clearly shown in Figs. 7 and 9. The inside cam $j^3$, as stated, acts on the roller 61 of the arm $j^2$ to shift this arm and the arm $j^1$ connected thereto, to thereby vary the tension of the spring $j$ which acts on the tool operating spindle. The high point 108 on the cam $j^3$ engages the roller 61 when the spinning operation commences and the spring $j$ is then under its greatest tension. As the spinning operation proceeds, the shape of the cam $j^3$ is such that the tension of the spring $j$ is gradually reduced. A second high point 108 on the cam places the spring $j$ under tension for the purpose hereinafter described. The low portion 83 of the cam $j^3$, as already described, reduces the tension of the spring $j$ when the shifter rod L is operated by the cam lug $l^3$ to oscillate the tool spindle and throw the tool into spinning operation.

On the side of the form $e$, opposite the spinning tool, are arranged two finishing or polishing tools $n$ and $n^1$, (see Figs. 1, 2 and 7). These tools are mounted in holders $n^2$ and the holders are adjustably fixed to a pair of spindles $n^3$ by set screws 109. The finishing tools are provided at their ends with pieces $n^4$ of hardened steel having concave inner faces for engaging the surface of the bottle cap or like article upon the form $e$. Spindles $n^3$ are journaled in bearing portions 110 and 111 at the side of the frame section $a$ and, like the operating spindle for the spinning tool, are arranged to reciprocate longitudinally and also oscillate to move the finishing tools $n$ and $n^1$ over the form $e$ and laterally to and from the form. Each spindle is provided with a sleeve 112, held in position by collars or nuts 113 and having laterally projecting pins 114 which engage vertical slots in the upper forked ends of a pair of shifter arms $n^5$ and $n^6$. Adjacent their lower ends, these arms are pivoted respectively to a pair of brackets 115 and 116 and at their extreme lower ends the shifter arms are provided with pins or rollers 117 and 118 which engage respectively with cam grooves $n^7$ and $n^8$, formed in the face of the cam $d^1$ (see Figs. 2 and 13). These cam slots thus control the longitudinal movement of the spindles $n^3$ and the finishing tools $n$ and $n^1$ thereon. The oscillating movement of the spindles and the lateral movement of the tools to and from the form $e$ are controlled by a pair of guide blocks $o$. These guide blocks are mounted in holders $o^1$ and are provided with cam-shaped upper edges which engage anti-friction rollers 119 on the ends of a pair of arms 120 that project outwardly from the finishing tool holders or supports $n^2$. The holders or supports $o^1$ are provided with longitudinal slots or seats for the guide blocks $o$ and the latter are connected to one end by pivots 121 to the holders. Set screws 122 extending through the opposite ends of the holders engage the guide blocks and adjust the same relatively thereto. The holders are adjustably secured by set screws 123 to the upper ends of a pair of plungers $o^2$ which are arranged to slide longitudinally through openings formed in a guide casing 124. The plungers $o^2$ are provided at their lower ends with heads 128 having rollers 129. These rollers engage the upper headed ends of studs 130 that are adjustably mounted upon the outer ends of a pair of shifter arms $o^3$ and $o^4$. Adjusting and lock nuts 131 hold the studs 130 in position upon the ends of the arms. The arms are horizontally disposed and are pivoted adjacent their inner ends upon an upwardly projecting portion 132 of the frame section $a$. At their inner ends the arms are provided with rollers 133 which are arranged to be engaged by the ribs $o^5$ and $o^6$ upon the face of the cam $d^1$. The ends of these ribs are provided with inclined cam faces 134 which engage the rollers 133 of the shifter arms $o^3$ and $o^4$ and thereby lift the plungers $o^2$ and guide blocks $o$ to throw the finishing tools inwardly toward the form $e$.

The outer end of the arm $o^4$ is deflected laterally and extends over a horizontal stop portion 135' of a bracket 135 (see Fig. 7). The outer end of the arm $o^3$ rests upon the out-turned upper end 136 of this bracket. The operating spindles $n^3$ of the finishing tools are provided with projecting pins 137 (see Figs. 2 and 6) and a pair of coiled springs 138 are connected at their ends to these pins and to the frame $a$ adjacent the upper portion of the bracket 115. These springs normally hold the spindles and finishing tools in inoperative position with the guide blocks $o$ and plungers $o^2$ depressed and the shifter arms $o^3$ and $o^4$ engaging the stops 135' and 136.

Before the spinning tool $h$ completes its work, as shown in Fig. 22, the cam grooves $n^7$ and $n^8$ operate the shifter arms $n^5$ and $n^6$ and move the spindles $n^2$ to carry the finishing devices opposite the end of the form $e$. Then, when the spinning tool has finished its work and moved away from the form, the cam ribs $o^5$ and $o^6$ throw the finished tools inwardly against the bottle cap or other article previously shaped upon the form, and the cam slots $n^7$ and $n^8$ move the spindles longitudinally, while the finishing tools $n$ and $n'$ are held in engagement with the surface of the article by the guide blocks $o$. The hardened steel portions $n^4$ of the finishing tools are thus moved successively over the surface of the article on the form $e$ to remove any marks left by the spinning tool and to burnish the surface. This operation of the finishing tools is indicated in Fig. 23. At the end of their movement, the cam ribs $o^5$ and $o^6$ pass from beneath the rollers 133 and the springs 138 oscillate the spindles $n^3$ and throw the finishing tools away from the form and back to their normal inoperative position.

To aid the work of the finishing or burnishing tools, a pair of fountain brushes or wads 139 of absorbent material are arranged adjacent the working portions of the tools upon the upper ends of a pair of metal pipes 140. These pipes are secured by clamps 141 to the tool holders $n^2$ and are connected by a pair of flexible rubber pipes 142 (see Fig. 7) to a transverse metal pipe 143. The other end of the pipe 143 (see Fig. 3) is connected to the lower end of the supply tank 96. This tank, as shown in Fig. 1, is divided into inner and outer compartments by a partition 96'. The outer compartment contains water or a solution of soap and water which is fed by the pipe 95 to the brush or wad 92 of absorbent material at the operative end of the spinning tool. The inner compartment contains alcohol or other suitable cleansing and polishing fluid which is fed by the pipes 143 and 142 to the fountain brushes or wads of absorbent material 139 of the finishing tools. Like the pipe 95 the pipe 143 is provided with a regulating valve 144. These valves are so set that the feed of liquid through the pipes is quite slow. The flexible pipes 95 and 142 of course do not interfere with the movement of the spinning and finishing tools.

Just below the inner end of the mandrel $c$ and below the form $e$ is a pivot bolt or pin 145 (see Fig. 7) upon which is mounted an arm $p^1$. The hub of this arm is provided on one side with a dove-tail slot and a tool holder $p^2$ is provided with a dove-tail lug 146 extending within the slot of the arm $p^1$ so that the tool holder may be adjusted longitudinally or in a direction parallel to the axis of the spinning mandrel and form $e$. A set screw 147, threaded through an opening in the hub of the arm $p^1$, engages the lug 146 and secures the tool holder $p^2$ in adjusted position. A cutting tool or knife $p$ extends through the sleeve-like holder $p^2$ and may be adjusted therethrough to and from the form $e$. Nuts 148 threaded on the knife engage the opposite ends of the holder and secure the knife in adjusted position.

The lower end of the arm $p^1$ is connected by a link 149 to the upper arm of a bell crank $p^3$. This bell crank is pivoted upon the upper end of the frame piece 132 and the lower inwardly extending arm thereof is provided with a roller 150 which is arranged to be engaged by a cam lug $p^4$ (see Fig. 13), on the face of the cam $d^1$. A spring 151 connected to the upper end of the bell crank $p^3$ holds the cutting tool or knife and its operating parts in normal idle position with the bell crank $p^3$ abutting against a lug 152 on the base plate 153 upon which the guide casing 124 is mounted. The shift of the tool toward the form $e$ is limited by an adjustable stop screw 154 threaded through the lower end of an arm or bracket 155, and which is engaged by the lower end of the arm $p^1$ when the latter is shifted.

Just before the finishing tool $n^1$ completes its stroke, the cam lug $p^4$ shifts the bell crank $p^3$ and shifts the cutting tool or trimmer into engagement with the bottle cap upon the form to cut off the unfinished flaring end, as indicated in Fig. 23. The operation of the trimmer is so timed that this will be effected before the second burnishing tool $n^1$ has finished its stroke, so that the second tool will remove any bur left by the cutter or trimmer $p$.

A spindle $r^1$ is journaled in the frame section $a$ above and slightly outside the tool operating spindle (see Figs. 1, 3, 6 and 7). An arm $r^2$ is adjustably fixed to the inner end of the spindle $r^1$ by a set screw 156 and this arm carries a curved nurling tool $r$, the inner forked end of which carries a rotatable nurling wheel $r^3$. The outer end of the arm $r^2$ is provided with a roller 157 which is arranged to engage a block $r^4$ which is similar in construction to the guide blocks $o$. It is mounted in a slot or seat in the holder $r^5$, is pivoted at one end thereto by pivots 158 and is adjusted therein by a set screw 160. The holder $r^5$ is adjustably fixed upon the upper end of a plunger $r^6$ by a set screw 161. This plunger extends through a guide sleeve or casing 162 secured to the inner side portion of the frame $a$, and the lower end of the plunger is provided with a head 163 having a roller 164 which engages the headed end of a stud 165. This stud is adjustably mounted upon the outer end of a shifter arm $r^7$, being held in position by adjusting and locking nuts 166. The shifter arm $r^7$ is pivoted on a bracket 167 and at its inner end is provided with a roller 168 which is arranged to be engaged by a cam lug $r^8$ upon the face of the cam $d$ (see Fig. 12). A spring 169 (see Figs. 1 and 6) connected to the spindle, normally holds the nurling tool and its operating parts in inoperative position with the outer end of the shifter arm $r^7$ engaging a stop piece 170 (see Fig. 7). When the finishing tools $n$ and $n^1$ have completed their work, the shifter arm $r^7$ is moved by the cam lug $r^8$, to thereby throw the nurling wheel against the bottle cap on the form $e$ to provide a decorating band upon the cap, as shown in Figs. 23 and 24.

The trimmer or knife $p$ and the nurling tool $r$ may be adjusted in accordance with the diameter and length of the cap to be constructed. The finishing tools $n$ and $n^1$ may be adjusted upon the spindles $n^3$ in accordance with the diameter of the cap to be manufactured and the guide blocks $o$ for the finishing tools can be adjusted in accordance with the varying taper of the different caps. The several guide casings for the different plungers $k^2$, $m^3$, $o^2$ and $r^6$ are provided with keys or screws 171 which engage key-ways 172 in the plungers to hold the latter in proper position.

The mandrel $c$, form $e$ thereon and the sleeve 7, which takes up the thrust of the mandrel, are provided with a central bore (see Figs. 14, 15 and 16) through which extends a plunger rod $s$. This plunger rod is guided at its inner end in the reduced portion of the bore in the mandrel, and at its outer end in an L-shaped bracket 173 (see Fig. 1) which projects from the upper outer portion of the frame section $a$. At its inner end the plunger rod is provided with a head $s^1$ which, during the spinning operation, sets within a recess in the end of the form $e$, as indicated in dotted lines in Figs. 16 and 17. Near its outer end the plunger rod is provided with a block or collar 174 held in position thereon by adjusting and locking nuts 175. This collar is provided with laterally projecting pins 176 which engage slots in the upper end of the shifter arm $s^2$. This shifter arm is pivoted at its lower end in a bracket 177, bolted to the lower, outer end portion of the frame section $a$. The arm is provided on one side with a plate 178 having an inclined slot 179 therein, which is arranged to be engaged by a pin or roller 180 on the rear end of an arm $s^3$ that is pivotally mounted in the frame section $a$ adjacent its inner end. The extreme inner end of the arm is provided with a pin or roller 181 which is arranged to engage the edge of the operating cam $d$ (see Figs. 12 and 14). The edge of this cam is circular throughout the greater portion of its periphery, but is provided with a short cam lug $s^4$ and a long cam lug $s^5$ which are arranged to engage the roller 181, and thereby move the shifter arms $s^3$ and $s^2$ and the plunger rod $s$. A spring 182 (see Fig. 14) connects the outer end of the arm $s^3$ and the transverse frame piece 8. When the roller 181 is in engagement with the circular edge portion of the cam $d$, this spring holds the arm $s^3$ in position, with the roller 181 thereon in the upper end of the slot 179 of the arm $s^2$, so that this arm and the plunger rod are held in outermost position with the head $s^1$ of the plunger in the recess in the form $e$. The bore in the mandrel $c$ at its outer portion and the bore in the part 7 are larger than the plunger and a spring 183 is coiled about the plunger rod and extends between the end of the enlarged portion of the bore in the mandrel and the nuts 175 on the plunger rod. This spring takes up lost motion between the plunger rod and its operating parts and serves to hold the plunger in retracted position with the head $s^1$ in the recess of the form $e$ during the spinning operation.

When the bottle cap or like article is completed, the cam $g^3$ and shifter arm $g^2$ (see Fig. 14) operate to retract the blank-holder $g$ which is then moved to the position shown in Fig. 24. The cam lug $s^4$ then engages the roller 181 to shift the arms $s^2$ and $s^3$ to move the plunger rod $s$ inwardly against the tension of the springs 182 and 183, and the head $s^1$ of the plunger engages the end of the completed cap to remove it from the form $e$, as shown in Fig. 24.

As the article or bottle cap is thus removed from the form $e$ it is preferably received by an article discharging mechanism. This mechanism comprises an arm $t$ (see Figs. 2 and 8) pivotally mounted on a part 184 that is adjustably mounted on a bracket 184' at the upper side portion of the frame section $b$. At its inner end the arm is provided with a sectional receptacle or carrier which is adapted to receive the completed article. One section $t^1$ of the receptacle or carrier is formed upon the end of the arm and the other section $t^2$ is hinged or pivoted to the section $t^1$. As most clearly shown in Fig. 24, the sections of the collar are provided with interlocking hinged lugs $t^{11}$ and $t^{21}$ through which extends a pintle 185. This pintle is rigidly connected by a screw 186 to one of the lugs of the section $t^2$ and a spring 187 coiled about the pintle and arranged within recesses in two of the lugs, is connected at its ends to one of the lugs of the section $t^1$ and to an end lug 188 fixed to the pintle. This spring tends to close the sections of the article receptacle or carrier or hold them in the relative position shown in Fig. 8.

A link 189 is pivotally connected to the arm $t$ and at its upper end and at its lower end is connected by a pivot bolt 190 to a coupling piece 191. This coupling piece is in turn connected by a pivot bolt 192 to the end of a shifter arm $t^3$ (see Figs. 2 and 8). The pivots 190 and 192 are arranged at right angles to each other, so that a universal connection is formed between the arm $t^3$ and the link 189. Adjacent its opposite end the arm $t^3$ is pivotally mounted upon a bracket 193 that projects laterally from the side of the frame section $b$, and at its extreme rear end the arm is provided with a pin or roller 194 which engages a cam slot $t^4$ in the face of a cam $t^5$ on the shaft 40. When the blank-holder $g$ has moved away from the completed article these parts operate to shift the article carrier $t^1$—$t^2$ to the position opposite the end of the form $e$, and in line with the axis thereof, as shown in Fig. 24, so that the article is shifted into the receptacle by the operation of the plunger $s$. The plunger is then withdrawn and the arm $t$ and article carried thereon are swung downwardly and outwardly in the direction indicated by the arrow in Fig. 8. The lug 188 on the hinge pintle 185 is provided with a curved, projecting arm 195 which, at the outer end of the movement of the article discharging mechanism, engages a pin 196 on the link 189, so that the section $t^2$ of the article carrier is moved away from the section $t^1$ and the completed bottle cap drops from the carrier into a receptacle or other holder placed to receive it. In order that the carrier may be brought accurately to position in line with the form $e$, the part 184 is adjustable in a slot $184^a$ in the bracket $184^1$, and is held in adjusted position by bolts $184^b$. The movement of the arm $t$ is limited by a pair of stop screws $t^6$ adjustably threaded through lugs $t^7$ on the part 184 and arranged to be engaged by shoulders $t^8$ formed in the hub of the arm $t$. The link 189 is preferably formed of two sections adjustably connected by bolts 197 (see Fig. 8), which extend through a slot 198 formed in one of the sections. As soon as the article is thus removed, the rough end portion of the cap, cut off by the trimmer $p$, is displaced from the form $e$ by a discharging device $u$. This discharging device is of U-shape, as most clearly shown in Fig. 7, and extends over the form $e$. It is mounted upon the end of a rod $u^1$ (see Figs. 1 and 16) which is slidable through a bearing in the upper, inner portion 5 of the frame section $a$ in a direction parallel to the axis of the spinning mandrel $c$. A spring 199 is coiled about the inner end of the rod and extends between a shoulder on the frame and a collar 200 on the rod. This spring tends to shift the discharging device $u$ toward the end of the form $e$, the movement of the discharging device and rod in this direction being limited by adjusting and locking nuts 201 fixed to the outer end of the rod and arranged to abut against the end of the bearing in the frame portion 5 through which the rod slides. The collar 200 on the inner end of the rod is provided with vertical slots in its side portions which are engaged by the upper forked end of a long upwardly projecting arm $u^2$ of a bell crank lever (see Figs. 3 and 7). This lever is pivoted at its lower end in a bracket 202 and the short, horizontal projecting arm $u^3$ of the bell crank lever is provided at its end with a roller 203 (see Figs. 3 and 13) which is arranged to engage the edge of the cam $d^1$. The edge of this cam is circular on the greater portion of its periphery, but at one point is provided with a recess having a shoulder $u^4$ at one end. The engagement of the cam $d^1$ with the roller 203 of the bell crank arm $u^3$ holds the discharging device or throw-off $u$ in normal position near the larger end of the form $e$, as shown in Figs. 16 and 24. In this position of the discharging device or throw-off, the spring 199 is under tension. After the finished cap has been discharged, as described and shown in Fig. 24, the plunger returns to normal position and the article carrier is shifted to remove the finished article. At this point the roller 203 of the bell crank passes over the shoulder $u^4$ of the cam $d^1$ and the spring 199 acts to quickly throw the discharging device or throw-off $u$ outwardly toward the end of the form $e$, so that the ring portion cut off from the end of the cap is sharply struck and thrown from the end of the mandrel, as indicated in Fig. 25.

Means are provided for automatically feeding the metal blanks, from which the bottle caps or like articles are spun, to position between the form $e$ and blank-holder $g$. These blanks are preferably cut from a continuous strip of metal foil. The upper end of the frame section $b$ is provided with a pair of outwardly projecting arms 204, and provided at their ends with open bearing slots which receive the pintles 205 of a roller 206 upon which a strip $f^1$ of metal foil is wound. An arm 207 pivoted on one of the side arms 204 normally rests upon one of the pintles 205, as shown. At its outer end the arm 207 is provided with a cross rod 208 to which two guide rods 209 are adjustably fixed by set screws 210 (see Figs. 2, 3 and 11). These guide rods engage the sides of the rolled strip of metal foil and hold it in position upon the roller 206, so that the strip will be properly fed to the machine. By swinging the arm 207 upwardly and at its lower end engaging a stop-pin 211 (see Fig. 2) on the side of the adjacent part 204, the rolled strip of metal foil may be removed or a new roll placed in position when the one on the machine is exhausted.

Upon the opposite part or projection 204 (see Figs. 3 and 14) is pivoted an arm $w^1$ upon the upper end of which is rotatably mounted a roller $w$. This roller projects laterally from the arm $w^1$ and extends over and engages a strip of metal foil passing from the roller 206. The arm $w^1$ is fixed at its lower end to a short shaft 212, the outer end of which is provided with an arm 213. This arm is connected by a depending link 214 to a shifter arm $w^2$. The arm $w^2$ is pivoted on the outer lower side portion of the frame section $b$ and at its extreme outer end is provided with a pin or roller 215 which engages a cam slot $w^3$ in the inner face of a cam $w^4$ on the cam shaft 40. The downward movement of the roller $w$, effected by the cam $w^4$ and the connections described, unwinds a portion of the strip $f^1$ from the roller and the upward movement of the roller leaves slack in the strip, so that the latter may be readily advanced by the intermittently acting feed mechanism.

The feed mechanism for the strip comprises a large roller $x$ and a small pressure roller $x^1$. These rollers are arranged between the upper portions of the sides of the frame section $b$ and the shaft 216 of the roller $x$ is journaled in suitable bearings in this frame section. The shaft 217 of the pressure roller $x^1$ is journaled in bearing blocks $217^1$ (see Figs. 2 and 3) which are arranged to slide in guide-ways or slots formed in a pair of lugs 218. Spring 219 mounted upon pins 220 engage the blocks 217' and force the pressure roller $x^1$ against the feed roller $x$ to thereby grip the strip of metal foil $f^1$ which passes over the roller $x$ and downwardly between the two rollers. Roller $x$ is preferably provided with guiding side flanges 221 (see Figs. 1 and 14) which guide the strip of metal foil as it passes over the roller and between which the pressure roller is fitted. A pair of cam arms 222 are mounted upon the ends of the shaft 217 of the pressure roller $x^1$ and are connected at their upper ends by a cross rod 223. The lower ends of these arms (see Figs. 2 and 3) are provided with cam-shaped portions which are arranged to act upon pairs of pins 224 fixed to the sides of the frame section $b$. By grasping the rod 223 the operator may shift the arms 222 until lugs 225 on the lower ends of the arms engage the lowermost pins 224. During this shift the lower cam-shaped edges of the arms will so act upon the pins 224 that the pressure roller $x^1$ is moved away from the roller $x$ and is locked in this disengaged position. During the operation of the machine the roller $x^1$ is always in the position shown, but, in starting the machine in oporation, it may be released, as described, and the strip of foil threaded through the feeding mechanism.

On one end the shaft 216 of the roller $x$ (see Fig. 2) is provided with a ratchet wheel 226 which is arranged to be engaged by a pawl 227 on a shifter arm $x^2$. This shifter arm is connected by a depending link 228 to the inner end of an arm $x^3$. This arm is pivoted at 229 to the lower, outer side portion of the frame section $b$ and at its extreme rear end is provided with a roller 230 which engages a cam slot $x^4$ in a cam $x^5$ on the shaft 40 (see Figs. 2 and 11). A spring 231 extends between the inner end of the arm $x^3$ and a stud 232 on the frame. This spring tends to lift the arm $x^3$ and link 228 and move the arm $x^2$ in proper direction to effect the operation of the pawl 227 on the ratchet 226 and advance the feed roller $x$. The cam slot $x^4$ is provided with a radial portion 233, shown in dotted lines in Fig. 2. The cam slot is designed to raise the outer end of the arm $x^3$, depress its inner end against the tension of the spring 231 and thus lower the arm $x^2$ to move the pawl 227 back idly over the teeth of the ratchet 226. When the pin or roller 230 on the arm $x^3$ reaches the radial portion 233 of the cam slot, the spring 231 acts to quickly shift the inner end of the arm $x^3$ and the arm $x^2$ upwardly to thereby effect the operation of the pawl and ratchet teeth and advance the roller $x^1$. Sufficient foil is thus quickly fed to the machine to form a single blank. The upward movement of the arm $x^2$ thus effected by the spring 231 is limited by a stop screw 234 adjustably threaded through a lug 235 on the upper side portion of the frame section $b$. The roller $w$ and the feed roller $x$ act alternately, that is to say, the roller $w$ is first operated to unwind a portion of the foil from the roller 206 and is then moved back so that there is a certain amount of slack between the roller and the feed roller $x$ and then the roller $x$ is operated to feed the slack portion of the metal strip to the machine. By this arrangement the intermittently acting feed mechanism may operate very quickly to feed the proper amount of foil to the machine at each operation since it does not have to do the work of unwinding the strip from its roll.

As the web $f^1$ passes on to the feed roll $x$ it moves between two guide rods 236 which depend from a cross rod 237, being adjustably secured thereto by set screws 238. The cross rod 237 (see Fig. 3) is supported upon an arm 239 extending upwardly from one of the side portions 204 of the frame section $b$. The lower ends of these guide rods are curved and engage the flanges 221 of the feed roll $x$, as shown most clearly in Fig. 14. They act as light brakes to prevent the overthrow of the feed roll.

From the rollers $w$ and $x^1$ the strip $f^1$ of metal foil extends downwardly over the inner face of a block 240 which forms part of the frame section $b$. At its inner face this block is provided with guide grooves 241 (see Figs. 14 and 16) which engage the edges of the strip of foil. A cover plate 242 bolted to the inner face of the block 240 closes the guide grooves 241. Between the upper ends of the guide grooves 241 and the rollers $x$ and $x^1$ are arranged a pair of guide straps 243 (see Figs. 8 and 14) which overlap the edges of the foil strip to guide the same.

The block 240 and the cover plate 242 are provided with openings concentric with the spinning mandrel $c$ and blank-holder $g$. The rectangular frame 30, through which the blank-holder supporting spindle $g^1$ slides, is bolted to the outer end of the block 240. The bore of the latter is larger than the support or spindle $g^1$ and a cylindrical punch-holder or support $y^1$ is arranged within the bore of the block 240 and around the spindle or blank-holder support $g^1$. The punch-holder snugly fits the bore of the block 240 and has a limited longitudinal movement therein. An annular, hardened steel punch $y$ is fixed to the inner end of the cylindrical punch-holder by screws 244 and the punch coöperates with a suitable circular die $y^2$ carried by the cover plate to punch out the circular metal blanks $f$ from the strip $f^1$.

The punch-holder $y^1$ is provided with pins 245 which project laterally through horizontal slots 246 in the sides of the block 240 and engage short vertical slots 247 in the upper ends of a pair of shifter arms $y^3$ (see Figs. 3, 8, 14 and 16). Those arms are fixed to a transverse shaft 248, which is journaled in a suitable bearing in the frame section $b$, below the block 240, and at one end (see Fig. 3) is provided with a rearwardly and downwardly extending arm $y^4$ having a pin or roller 249 in its outer end which engages a cam slot $y^5$ in a cam $y^6$ on the shaft 40 (see Figs. 3 and 11).

The operation of the roller $x$ is timed to quickly advance the strip of metal foil through the guide-ways 241 when the punch $y$ and blank-holder $g$ are in their extreme retracted positions, shown in Fig. 25. As above described, the plunger $s$ is first advanced by a short lug $s^4$ of the cam $d$ to discharge the completed cap, as shown in Fig. 24. It is then withdrawn by the springs 182 and 183 and is advanced again to a greater extent by the long cam lug $s^5$ and is projected until it engages the face of the metal strip. At the same time, the cams $y^6$ and $g^3$ (see Figs. 3 and 14) slightly advance the punch $y$ and the blank-holder $g$ so that a circular blank $f$ is punched from the strip $f^1$ and is gripped between the blank-holder and the head $s^1$ of the plunger $s$, as shown in Fig. 26. The position of the parts of the machine assumed at this point just after the blank has been cut, is that shown in all of the figures of the drawings, except Figs. 9 and 10 and Figs. 17 to 25, inclusive. In Figs. 9 and 10 the spinning tool and its controlling parts are shown in the position assumed during a portion of the spinning operation.

After the blank is cut, the cam $g^3$ (see Fig. 14) acts to move the shifter arm $g^2$ inwardly. The first movement of this arm compresses the spring 39 so that the blank is firmly gripped between the blank-holder $g$ and the head $s^1$ of the plunger $s$. The cam lug $s^5$ then permits the springs 182 and 183 to retract the plunger $s$ while the blank-holder $g$ and its supporting spindle $g^1$ are advanced to thereby carry the blank $f$ across the gap between the blank cutting mechanism and the end of the form $e$. The springs 182 and 183 take up all lost motion between the plunger $s$ and its shifting mechanism and the spring 39 presses the blank holder $g$ inwardly so that the blank is firmly gripped between the blank-holder and the plunger during this movement. Moreover, the spring 39 acts through the medium of the spindle $g^1$ and blank-holder $g$ to firmly hold the blank against the end of the form during the spinning operation, while, at the same time, the blank-holder is free to rotate with the spinning mandrel, form $e$ and blank $f$, as the latter is spun. To further insure the proper operation of the blank-holder and to take up all lost motion between the shifter arm $g^2$, spindle $g^1$ and cam $g^3$, a coiled spring 250 (see Figs. 3 and 14) is connected to the upper end of the shifter arm and to a pin 251 on the side of the frame section $b$.

The operation of the different parts has been fully set forth in connection with the detail description thereof.

Briefly, the operation of the machine as a whole is as follows: The connecting gearing between the cam shafts 16 and 40 is such that they rotate at the same speed and the machine passes through a cycle of operations for each revolution of these shafts. With the parts of the machine in the position shown in Figs. 1 to 8, 11 to 16 and 26, the blank has been cut and the blank-holder $g$ and plunger $s$, the movements of which are controlled respectively by the cam $g^3$ on the shaft 40 and the lug $s^4$ of the cam $d$ on the shaft 16, act to move the blank to position upon the end of the form where it is held by the spring pressed blank-holder $g$, as shown in dotted lines in Fig. 16 and in full lines in Fig. 17. The cam slot $h^5$ of the cam $d$ then acts upon the shifter arm $h^4$ to move the tool operating spindle and spinning tool $h$ inwardly until the pin $k^4$ is beyond the inner end of the guide block $k$, as shown in dotted lines in Fig. 4. During this inward shift of the tool, it moves over the edge of the blank $f$ on the end of the form $e$, and to prevent any accidental engagement of the tool with the frame, the tension of the spring $j$ of the tool spindle is increased by the operation of the high part 108 of the cam $j^3$ upon the roller 61 of the arm $j^2$. The arm $l^4$ of the shifter rod L, the movement of which is effected by the lug $l^3$ of the cam $d$, then acts upon the pin 59 of the tool spindle to oscillate the latter and throw the tool laterally into the position shown in Fig. 17. During this shift the roller 61 of the arm $j^2$ is in the depressed portion 83 of the cam $j^3$, so that there is little tension upon the spring $j$, and the tool spindle is easily oscillated by the shifter rod L to move the tool toward the form.

Upon the first forward stroke of the tool and tool spindle effected by the cam slot $h^5$ and shifter arm $h^4$, the roller 74 on the inner end of the pin $k^4$ passes on to the upper edge of the guide block $k$, as shown in Figs. 9 and 10, and remains there during the spinning operation to control the oscillation of the tool spindle and the lateral movements of the tool. The cam slot $h^5$ then successively reciprocates the tool spindle and tool through the medium of the arm $h^4$ and the cam $k^3$, through the medium of the plunger $k^2$, oscillates the guide block $k$, tool spindle $h^2$—$h^3$ and tool $h$ as the latter reciprocates, so that the tool is moved through a series of different paths over the face of the blank $f$ to draw and shape the same step-by-step, as indicated in Figs. 18 to 22. During these movements of the tool the frame support $m$, the movements of which are controlled by the cam $m^4$ on the shaft 16, is gradually withdrawn, but acts to support the free edge of the blank and coöperates with the tool to apply the proper amount of pressure to draw out the metal body of the blank.

At the end of the last reciprocation of the tool, the roller 74 on the end of the pin $k^4$ passes over the end of the guide block, and the spring $j$ throws the tool and tool spindle away from the form to inoperative position, shown in Fig. 7. The tool spindle and tool are then moved inwardly slightly by the cam $h^5$, so that the roller 74 of the pin $k^4$ passes beneath the guide block $k$ (see Figs. 4 and 6) and the spinning tool is thus held in inoperative position until the beginning of the next operation.

The finishing tools $n$ and $n^1$ and the trimmer or knife $p$, the movements of which are controlled by the cam slots $n^8$ and $n^7$, ribs $o^5$ and $o^6$ and lug $p^4$ of the cam $d^1$, are then operated, as described, to burnish the cap upon the form and trim off the unfinished edge at the end of the cap. The nurling tool $r$, the movement of which is controlled by the cam lug $r^8$ of the cam $d$, is operated after the finishing tool $n$ completes its movement. The springs 138, connected to the pins 137 of the finishing tool spindles $n^3$ operates, as described, to throw the finishing tool $n$ away from the form when the tool finishes its stroke, but to make sure that the throw-out movement of the finishing tool $n$ will occur, in time to permit the operation of the nurler $r$, and to prevent the latter from colliding with finishing tool $n$, the spindle $n^3$ of this finishing tool is provided with a pin 252 (see Figs. 1 and 2) which is arranged to be engaged by a cam lug 253 on the bearing portion 111 of the frame to positively throw the finishing tool $n$ to inoperative position at the end of its movement.

When the cap is completed the finishing tools, trimmer and nurling tool are restored to normal position and the blank-holder $g$ is moved away from the end of the form $e$. The discharging device $t$, the movement of which is controlled by the cam $t^5$ on the shaft 40, is then shifted so that the carrier sections $t^1$ and $t^2$ thereof are opposite the end of the form. The plunger $s$ is then advanced by the short lug $s^4$ of the cam $d$ to project the finished cap into the discharging carrier and after the plunger is withdrawn, the carrier moves back until the arm 195 thereon (see Fig. 8) strikes the pin 196 to move the carrier section $t^2$ and discharge the completed cap into a suitable receptacle or other device placed to receive it.

The foil feeding mechanism is then operated to advance the strip of foil $f^1$, the punch $y$ cuts the next blank therefrom and the plunger $s$ is again advanced to engage the same, as shown in Fig. 26. The parts are then in position for the next operation.

It is obvious that numerous changes may be made in the details set forth and that parts of the invention may be employed without its adoption as a whole.

I claim as my invention:—

1. In spinning-machines, the combination with a blank-holder, of spinning mechanism arranged to act repeatedly and in a succession of different paths upon the portion of the blank to be spun to draw and shape the same to form and automatic means controlling the step by step movements of said mechanism.

2. In spinning-machines, the combination with a spinning-mandrel, a form thereon and with a coöperating blank-holder, of a spinning-tool and mechanism arranged to automatically reciprocate said tool back and forth in a series of different paths and in axial direction over said form to draw and shape the blank step by step upon said form.

3. In spinning-machines, the combination with a spinning-mandrel and with a coöperating blank-holder, of a spinning tool arranged to act repeatedly upon the blank to draw and shape the same step-by-step to complete form, a shifter for reciprocating said spinning tool and an automatically controlled guide for varying the path of said spinning tool at each repeated reciprocation.

4. In spinning-machines, the combination with a spinning-mandrel and form thereon and with a coöperating blank-holder, of a spinning-tool, a longitudinally and laterally shiftable support whereon said tool is mounted, mechanism for successively reciprocating said support, a guide controlling the lateral shift of said support and means for variably shifting said guide during the successive reciprocation of said support.

5. In spinning-machines, the combination with a spinning mandrel and with a coöperating blank-holder, of a spinning tool, a longitudinally shiftable, rotatable spindle whereon said spinning tool is mounted, mechanism for reciprocating said spindle and mechanism for controlling the rotary movement of said spindle as it is reciprocated.

6. In spinning machines, the combination with a spinning mandrel, and with a coöperating blank-holder, of shaping means arranged to act successively upon the blank to draw and shape the same step-by-step to complete form, a shifter for successively reciprocating said shaping means, a guide for varying the path of movement of said shaping means at the successive reciprocations and means for controlling the movement of said guide.

7. In spinning-machines, the combination with a spinning mandrel and form thereon and with a coöperating blank-holder, of a spinning tool arranged to act upon the blank successively in a series of different paths to draw and shape the same upon said form, a shifter for successively reciprocating said spinning tool, a guide-block for varying the path of said tool at each successive reciprocation and a cam for controlling the movement of said guide-block.

8. In spinning-machines, the combination with a spinning mandrel, a form thereon and with a coöperating blank-holder, of a spinning tool, a longitudinal, shiftable, rotatable spindle whereon said tool is mounted, a shifter for successively reciprocating said spindle, a guide-block for controlling the rotary movement of said spindle and separate cams for controlling said shifter and said guide-block.

9. In spinning machines, the combination with a spinning mandrel and with a coöperating blank-holder, of a spinning tool, means for reciprocating and guiding said spinning tool arranged to throw said spinning tool away from said mandrel at the end of a series of repeated reciprocations and an automatically actuated shifter for throwing said tool into operative position at the beginning of the succeeding operation.

10. In spinning machines, the combination with a spinning mandrel, of a spring-held spinning tool, a guide for holding said tool in working position against the tension of its spring, means for reciprocating said tool and for releasing it from said guide at the end of each operation, a shifter for returning said tool into operative relation with said guide against the tension of its spring and means for actuating said shifter.

11. In spinning machines, the combination with a spinning mandrel, of a spinning tool, a longitudinally shiftable, rotatable spindle whereon said spinning tool is mounted, a guide-block for controlling the rotary movement of said spindle, a shifter for reciprocating said spindle arranged to release the same from said guide-block at the end of each operation, a shifting plunger for rotating said spindle and tool into operative relation with said guide-block at the beginning of the succeeding operation and mechanism for operating said shifter, said guide-block and said plunger.

12. In spinning machines, the combination with a spinning mandrel and with a coöperating blank-holder, of a spinning tool and a blank-support arranged to act upon opposite sides of the blank to draw and shape the same and means for variably shifting said blank-support with respect to and independently of said spinning tool, whereby the pressure exerted upon the blank is varied as the blank is spun.

13. In spinning machines, the combination with a spinning mandrel and with a coöperating blank-holder, of a spinning tool and blank support arranged to engage opposite sides of the blank to draw and shape the same, and separate automatically operating mechanisms for respectively and variably shifting said tool and said blank-support.

14. In spinning machines, the combination with a spinning mandrel and with a coöperating blank support, of a spinning tool arranged to act upon one side of the blank, a longitudinally movable metal supporting plate arranged to engage the opposite side of the blank and separate automatic mechanism for variably and relatively shifting said tool and said metal support.

15. In spinning machines, the combination with a spinning mandrel, a form thereon and a coöperating blank-holder, of a spinning tool and blank support arranged to engage opposite sides of the blank and to reciprocate over said form and automatically acting mechanism for variably shifting said tool and said blank support.

16. In spinning machines, the combination with a spinning mandrel, a form thereon and with a coöperating blank-holder, of a spinning tool and blank support arranged to act upon opposite sides of the blank to draw and shape the same, a longitudinally reciprocating support whereon said tool is mounted, a longitudinally reciprocating member whereon said blank support is mounted and separate mechanisms for variably actuating said tool support and said member.

17. In spinning machines, the combination with a spinning mandrel and with a coöperating blank support, of means arranged to act successively upon the blank to draw and shape the same step-by-step to complete the article, automatic mechanism for controlling the successive operations of said shaping means, a blank support opposed to said shaping means and means for controlling the shift of said blank support relatively to said shaping means during the spinning operation.

18. In spinning machines, the combination with a spinning mandrel and with a coöperating blank support, of means acting upon the blank to draw and shape the same to form, a mechanically-supported plate arranged to engage the outer edge of the metal blank and support the same during the entire spinning operation and separate automatic mechanisms controlling the movement of said tool and said blank support.

19. In spinning machines, the combination with a spinning mandrel and form and with a coöperating blank-holder, of a spinning tool arranged to act upon the face of the blank to draw and shape the same and a longitudinally movable plate arranged to engage and support the edge of the metal blank during the spinning operation and automatic mechanism for shifting said plate relatively to said tool.

20. In spinning machines, the combination with a spinning mandrel and coöperating blank-holder, a spinning tool arranged to act upon the face of the blank to draw and shape the same, a metal-supporting plate arranged to engage and support the edge of the metal blank during the spinning operation, and automatic mechanism for relatively shifting said supporting plate and said tool to vary the pressure exerted thereby upon the blank.

21. In spinning machines, the combination with a spinning mandrel, a form thereon and with a coöperating blank-holder, of a spinning tool arranged to act upon said blank successively in a series of different paths to draw and shape the same step-by-step upon the form, a blank support opposed to said spinning-tool and arranged adjacent said form and means for shifting said blank support during the spinning operation.

22. In spinning machines, the combination with a spinning mandrel and with a coöperating blank-holder, of a spinning tool arranged to act upon the face of the blank, means for reciprocating said tool in a series of different paths, a blank support opposed to said tool and means for shifting said support in one direction during the successive reciprocations of said tool.

23. In spinning machines, the combination with a spinning mandrel and form thereon and with a coöperating blank-holder, of shaping means arranged to act upon said blank successively in different paths to draw and shape the same step-by-step upon said form, a blank support opposed to said shaping means and means for shifting said blank support in one direction during the successive operations of said shaping means.

24. In spinning machines, the combination with a spinning mandrel, a form thereon and a coöperating blank holder, of shaping means for spinning the blank upon said form, a finishing tool radially movable into and out of working position and also shiftable over the surface of said form, and mechanism for automatically and successively actuating said shaping means and said finishing tool.

25. In spinning machines, the combination with a blank holder and with shaping means for spinning the blank to form, of a longitudinally and laterally shifting finishing tool, mechanism for reciprocating said tool, a shifting guide for controlling the lateral movement of said tool and automatic mechanism controlling the movement of said guide.

26. In spinning machines, the combination with a spinning mandrel and with a coöperating blank holder, of a spinning tool and operating mechanism therefor, a finishing tool, a longitudinally movable and rotatable spindle whereon said finishing tool is mounted, a shifter for reciprocating said spindle, a guide controlling the rotary movement of said spindle, a shifting support whereon said guide is mounted and mechanism for controlling the movement of said support.

27. In spinning machines, the combination with a spinning mandrel and coöperating blank-holder, of spinning tool mechanism arranged to shape the blank to form, a trimmer, means for successively operating said mechanism and said trimmer and separate devices for ejecting the completed article and the trimmed-off portion from said mandrel.

28. In spinning machines, the combination with a spinning mandrel, a form thereon and a coöperating blank holder, of a spinning tool and a finishing tool radially movable to and from working position and axially movable over said form, a trimmer shiftable to and from said form, and mechanism for automatically and successively actuating said spinning and finishing tools and said trimmer.

29. In spinning machines, the combination with a spinning mandrel held against longitudinal movement and with a coöperating blank holder, of a spinning-tool for shaping the blank to form, mechanism for automatically actuating said spinning-tool to act upon successive blanks, a movable support against which the blank is spun, mechanism for automatically and successively shifting said blank holder to release the completed articles, a shifter independent of said movable support for discharging the completed article from said spinning mandrel and mechanism for automatically and successively actuating said shifter.

30. In spinning machines, the combination with a spinning mandrel held against longitudinal movement and a form thereon, of a shifting blank holder arranged to engage the end of said form, a plunger longitudinally shiftable through said spinning mandrel and said form, and automatic mechanism for successively shifting said blank holder away from said form to release the completed article and for shifting said plunger to discharge the same from said form.

31. In spinning machines, the combination with a spinning mandrel, of a shiftable blank holder coöperating therewith, shaping means for spinning the blank to form, an article carrier for removing the completed articles from the machine, a discharging shifter movable through said mandrel for shifting the completed article into said carrier and automatic mechanism for positively actuating said blank holder, said article carrier and said discharger in succession to release and remove the completed article.

32. In spinning machines, the combination with a spinning mandrel and form thereon, of a longitudinally shiftable blank holder coöperating therewith, a discharge plunger longitudinally shiftable through said mandrel and form, an article carrier laterally shiftable opposite the end of said form into which the article is shifted by the movement of said plunger and mechanism for shifting said blank holder, said article carrier, and said discharge plunger in succession to release and discharge the completed article.

33. In spinning machines, the combination with shaping means arranged to act repeatedly and step-by-step upon the blank to spin the same to form, of a shifting blank holder, automatic mechanism controlling the step-by-step operation of said shaping mechanisms, mechanism automatically acting to shift said blank holder to release the completed article and mechanism for automatically and successively feeding flat blanks to said blank holder and into spinning position.

34. In spinning machines, the combination with a spinning mandrel, of shaping means arranged to act repeatedly and step-by-step upon the blank to spin the same to form, a blank holder shiftable to release the completed article, a discharge shifter therefor, a feed for delivering flat blanks to said blank holder, and automatic mechanism for effecting the step-by-step operation of said shaping means and for successively actuating the blank holder, discharge shifter and blank feed.

35. In a spinning machine, the combination with a machine frame, of a spinning mandrel rotatably mounted in said frame, a blank holder coöperating with said mandrel rotatably mounted in the machine frame, means for rotating said mandrel, spinning devices for engaging the blank to spin the same to form, and mechanism in axial alinement with said mandrel and said blank holder for cutting the blanks from a continuous strip.

36. In spinning machines, the combination with a spinning mandrel and with shaping means for spinning the blank to form, of a blank holder shiftable in line with said mandrel, means for feeding the continuous metal strip between said mandrel and said blank holder, a punch mounted in line with said mandrel for cutting the separate blanks from the metal strip and automatic mechanism for actuating said blank holder, said feed and said punch.

37. In spinning machines, the combination with a spinning mandrel and form thereon held against longitudinal shift and with shaping means for spinning the blank to form, of a blank holder shiftable to and from the end of said form, a plunger longitudinally shiftable through said mandrel and said form, automatic mechanism for first shifting said blank holder and for subsequently shifting said plunger away from the end of said form to release and discharge the article and for simultaneously shifting said blank holder and said plunger toward the end of said form to place a new blank in spinning position and automatic mechanism for feeding blanks between said holder and plunger when the latter are shifted away from the end of said form.

38. In spinning machines, the combination with a spinning mandrel and with shaping means for spinning the blank to form, of a blank holder, a plunger coöperating therewith, said blank holder and plunger being longitudinally shiftable in line with said spinning mandrel, and separate automatic mechanisms respectively controlling the movements of said blank holder and plunger arranged to successively shift said parts away from the end of said mandrel to release and discharge the complete articles and to simultaneously shift said holder and plunger toward the end of said mandrel with a new flat blank gripped between them.

39. In spinning machines, the combination with a spinning mandrel and form thereon and with shaping means for spinning the blank upon said form, of a blank holder shiftable to and from the end of said form, a plunger longitudinally shiftable through said mandrel and form, separate automatic mechanisms for respectively controlling the longitudinal shift of said blank holder and said plunger, said mechanisms being arranged to successively shift said blank holder and said plunger away from the end of said form to release and discharge the article and to simultaneously shift said parts toward the end of said form to feed a new blank to position, and automatic mechanism for feeding blanks between said blank holder and plunger when the latter are shifted away from the end of said form.

40. In spinning machines, the combination with a spinning mandrel and form thereon and with shaping means for spinning the blank upon said form, a blank holder longitudinally shiftable to and from said form, a plunger longitudinally shiftable through said mandrel and form, a punch and die through which said blank holder reciprocates, means for feeding a strip of metal to said punch and die, and automatic mechanism controlling the operation of said parts, substantially as described.

41. In automatic spinning machines, the combination with a blank holder, of spinning mechanism coöperating therewith arranged to act repeatedly and step-by-step upon each blank, and continuously driven operating mechanism therefor arranged to automatically actuate said step-by-step spinning mechanism to draw and shape successive blanks to form.

42. In automatic machines for spinning bottle caps and the like, the combination with a blank holder, of spinning tool mechanism arranged to act repeatedly and step-by-step upon like portions of each blank to draw and elongate the same to complete shape, continuously driven devices for automatically actuating said step-by-step spinning mechanism, to operate upon successive blanks and automatic mechanism for successively releasing and discharging the completed articles.

43. In automatic machines for spinning bottle caps or the like from flat blanks, the combination with a machine frame, of a horizontal spinning mandrel rotatably mounted in the machine frame, spinning devices coöperating therewith, a punch and die in axial alinement with said spinning mandrel for cutting the blanks from a flat blank, and mechanism adapted to grip the flat blanks and feed the same across the gap between said punch and die and said spinning mandrel.

44. In automatic machines for spinning bottle caps and the like to complete form from flat blanks, the combination with the machine frame, of a spinning mandrel rotatably mounted in the machine frame, mechanism adapted and arranged to automatically and successively cut and feed flat blanks into spinning position upon the end of said mandrel, mechanism arranged to engage the flat blanks upon the mandrel and automatically and successively spin the same to form, and continuously driven devices for operating said feeding mechanism and said spinning mechanism.

45. In automatic machines for spinning bottle caps or the like to complete form from flat blanks, the combination with the machine frame, of a spinning mandrel rotatably mounted in the machine frame, mechanism adapted and arranged to automatically and successively cut and feed flat blanks directly in spinning position upon the end of said mandrel, mechanism arranged to engage said flat blanks and automatically and successively spin the same to form, mechanism for automatically and successively releasing and discharging the completed articles, and continuously driven devices for operating said feeding mechanism, said spinning mechanism and said releasing and discharging mechanism.

46. In spinning machines, the combination with a spinning mandrel, and coöperating spinning tool, of means for effecting a reciprocating movement between said tool and mandrel in axial direction and automatically controlled means for differently varying the distance between the same at each successive reciprocation, whereby the blank will be acted upon in a series of different paths and spun step-by-step to complete shape.

47. In spinning machines, the combination with a blank-holder, of spinning-tool mechanism and a coöperating metal support arranged to engage opposite sides of the blank and mechanism connected to positively shift said metal support relatively to and independently of said spinning-tool mechanism as the blank is spun.

48. In a spinning machine, the combination with a spinning mandrel and with a coöperating blank holder, of a spinning tool, means for reciprocating said spinning-tool and means for rotating said spinning tool upon its axis as it is reciprocated.

49. In a spinning machine, the combination with a spinning mandrel and a coöperating blank holder, of a spinning tool, a longitudinally reciprocating, oscillating spindle whereon said tool is rotatably mounted, means for reciprocating and oscillating said tool and said spindle and means for rotating said tool upon its axis as it is shifted.

50. In a spinning machine, the combination with a spinning mandrel and coöperating blank holder, of a spinning tool, a reciprocating and oscillating spindle whereon said tool is rotatably mounted, mechanism for reciprocating and oscillating said spindle to effect the step-by-step action of said tool upon the blank in a series of different paths and a rack-bar held against longitudinal movement and engaging said tool to rotate the same about its axis as it is shifted.

51. In a spinning machine, the combination with a spinning mandrel and coöperating blank holder, of a spinning tool, mechanism for reciprocating and oscillating said tool to act upon the blank in a series of different paths, said tool having a rounded operative end portion.

52. In a spinning machine, the combination with a spinning mandrel and coöperating blank holder, of a spinning tool, means for reciprocating and oscillating said spinning tool, a liquid reservoir, and a flexible pipe leading from said reservoir to said spinning tool.

53. In a spinning machine, the combination with a spinning mandrel and a coöperating blank holder, of a spinning tool, a finishing tool, mechanism for shifting said spinning and said finishing tools in radial and axial direction to act upon the blank, a liquid reservoir and flexible pipes connecting said reservoir to said tools.

54. In spinning machines, the combination with a spinning mandrel and form thereon and a coöperating blank holder, of a spinning tool, a pair of finishing tools, mechanism for shifting said tools to and from said form and mechanism for successively reciprocating said tools over said form.

55. In a spinning machine, the combination with a spinning mandrel and coöperating blank holder, of a spinning tool movable in radial and axial directions to act on the blank, a nurling tool, a trimmer, and mechanism for automatically and successively actuating said spinning and said nurling tools and said trimmer.

OTTO J. KÜSTNER.

Witnesses:
ELEANOR HAGENOW,
KATHARINE GERLACH.